(12) United States Patent
Shiomi

(10) Patent No.: US 10,804,554 B2
(45) Date of Patent: Oct. 13, 2020

(54) FUEL CELL SYSTEM AND CONTROL METHOD FOR FUEL CELL SYSTEM

(71) Applicant: NISSAN MOTOR CO., LTD., Yokohama-shi, Kanagawa (JP)

(72) Inventor: Takeshi Shiomi, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 185 days.

(21) Appl. No.: 16/064,184

(22) PCT Filed: Nov. 28, 2016

(86) PCT No.: PCT/JP2016/085171
§ 371 (c)(1),
(2) Date: Jun. 20, 2018

(87) PCT Pub. No.: WO2017/110374
PCT Pub. Date: Jun. 29, 2017

(65) Prior Publication Data
US 2019/0006683 A1    Jan. 3, 2019

(30) Foreign Application Priority Data

Dec. 25, 2015  (JP) ................................. 2015-253852

(51) Int. Cl.
*H01M 8/04858* (2016.01)
*H01M 8/04828* (2016.01)
(Continued)

(52) U.S. Cl.
CPC ......... *H01M 8/0494* (2013.01); *H01M 8/043* (2016.02); *H01M 8/04022* (2013.01);
(Continued)

(58) Field of Classification Search
None
See application file for complete search history.

(56) References Cited

U.S. PATENT DOCUMENTS

| 6,416,893 B1 * | 7/2002 | Clingerman ...... H01M 8/04007 429/416 |
| 7,070,633 B2 | 7/2006 | Okada et al. |

(Continued)

FOREIGN PATENT DOCUMENTS

| DE | 10 2015 005 978 A1 | 12/2015 |
| EP | 3 396 760 A1 | 10/2018 |
| JP | 2002/198081 A | 7/2002 |
| JP | 2014/26891 A | 2/2014 |
| WO | WO 2012/176528 A1 | 12/2012 |

*Primary Examiner* — Alix E Eggerding
(74) *Attorney, Agent, or Firm* — Foley & Lardner LLP

(57) ABSTRACT

A control method for a fuel cell system with a gas supplying device configured to supply fuel gas and oxidant gas to a fuel cell, includes a power generating operation step of performing a power generating operation for causing the fuel cell to generate power by controlling the fuel gas and the oxidant gas to be supplied to the fuel cell on the basis of a load required of the fuel cell. Further, the control method includes an autonomous operation step of performing an autonomous operation of the fuel cell when the load drops to or below a predetermined value. In the autonomous operation, power supply from the fuel cell system to the load is stopped and the fuel gas is passed to an anode of the fuel cell.

14 Claims, 16 Drawing Sheets

(51) Int. Cl.
*H01M 8/0432* (2016.01)
*H01M 8/04537* (2016.01)
*H01M 8/04746* (2016.01)
*H01M 8/0612* (2016.01)
*H01M 8/04014* (2016.01)
*H01M 8/043* (2016.01)
*H01M 8/04302* (2016.01)
*H01M 8/124* (2016.01)

(52) U.S. Cl.
CPC ... *H01M 8/04302* (2016.02); *H01M 8/04328* (2013.01); *H01M 8/04343* (2013.01); *H01M 8/04559* (2013.01); *H01M 8/04753* (2013.01); *H01M 8/04776* (2013.01); *H01M 8/0618* (2013.01); *H01M 2008/1293* (2013.01)

(56) References Cited

U.S. PATENT DOCUMENTS

| | | |
|---|---|---|
| 2002/0068204 A1 | 6/2002 | Iio et al. |
| 2002/0078628 A1 | 6/2002 | Okada et al. |
| 2005/0112419 A1 | 5/2005 | Zheng et al. |
| 2006/0003205 A1 | 1/2006 | Yoshida et al. |
| 2009/0035630 A1* | 2/2009 | Kumada ........... H01M 8/04238 429/430 |
| 2012/0028144 A1 | 2/2012 | Tanaka et al. |
| 2012/0276460 A1* | 11/2012 | Kumei ............. H01M 8/04104 429/410 |
| 2014/0113162 A1 | 4/2014 | Hottinen et al. |
| 2014/0120439 A1 | 5/2014 | Makino et al. |
| 2015/0255808 A1 | 9/2015 | Nakamura et al. |

\* cited by examiner

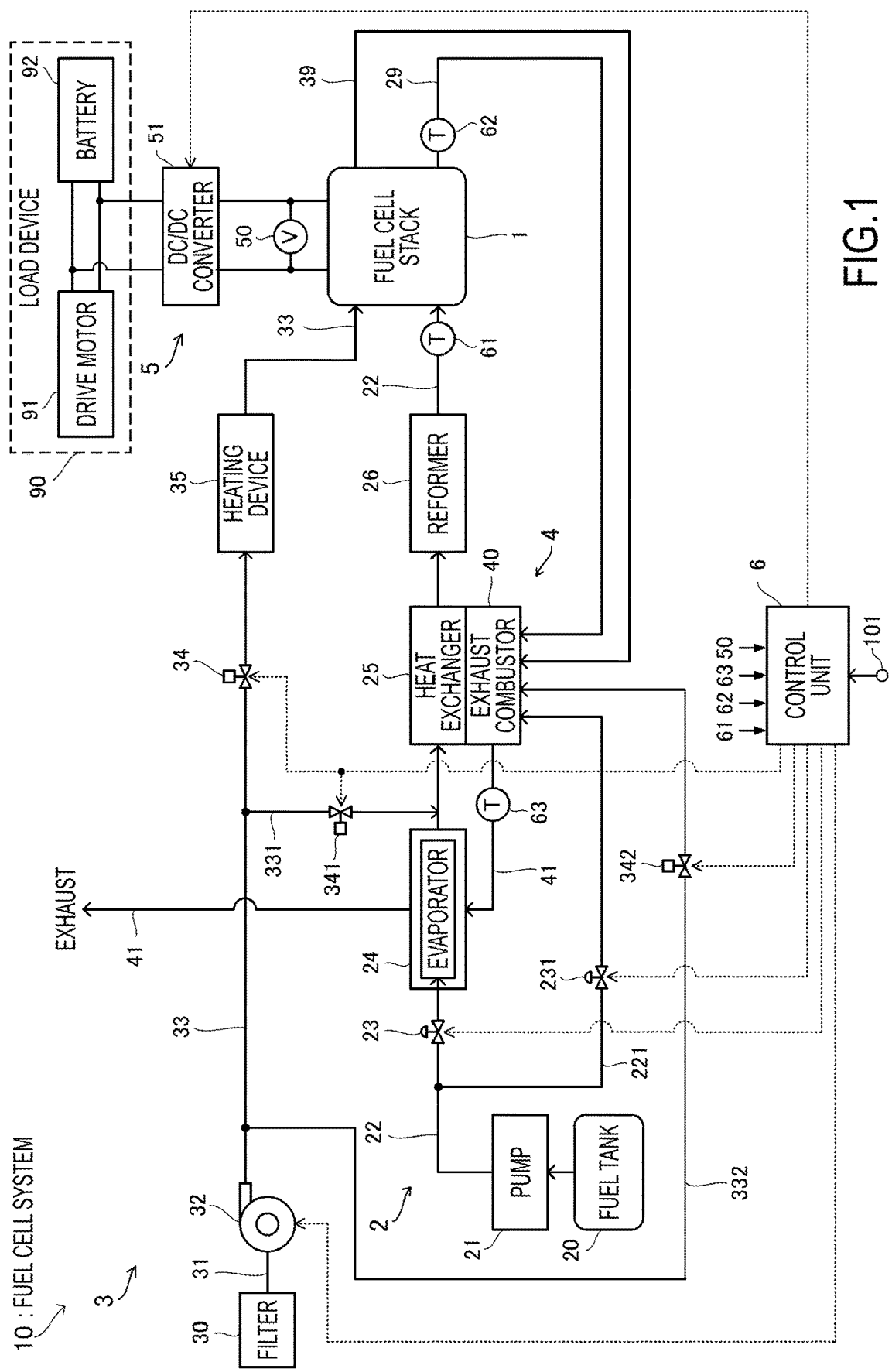

| COMBUSTOR TARGET OUTLET TEMPERATURE | Tc1 | Tc2 | Tc3 |
|---|---|---|---|
| COMBUSTOR TARGET FUEL FLOW RATE | Qfu1 | Qfu2 | Qfu3 |
| COMBUSTOR TARGET AIR FLOW RATE | Qai1 | Qai2 | Qai3 |

FIG.8B

FUEL CELL SYSTEM AND CONTROL METHOD FOR FUEL CELL SYSTEM

TECHNICAL FIELD

The present invention relates to a fuel cell system for performing an autonomous operation when power supply to a load connected to a fuel cell is stopped, and a control method for a fuel cell system.

BACKGROUND ART

The specification of US 2014/0113162A discloses that a fuel cell system for supplying a predetermined voltage to a fuel cell stack to suppress the oxidation of an anode of a fuel cell at an emergency stop.

SUMMARY OF INVENTION

In the fuel cell system as described above, an autonomous operation of the fuel cell is performed to maintain the fuel cell in a state suitable for power generation when the fuel cell system enters a state where power supply to a load such as a battery or electric motor is stopped, i.e. a so-called idle stop state. For example, in the autonomous operation, the supply of fuel to the anode is stopped to suppress wasteful fuel consumption.

However, since oxygen permeates from a cathode to the anode in the fuel cell during the autonomous operation in such a configuration, an anode part may be oxidized. In this way, power generation performance of the fuel cell may be reduced in a state where power supply from the fuel cell system to the load is stopped.

The present invention was developed focusing on such a problem. The present invention aims to provide a fuel cell system for suppressing a reduction in power generation performance of a fuel cell when power supply of the fuel cell to a load is stopped and a control method for the fuel cell system.

According to one aspect of the present invention, a control method for a fuel cell system with a gas supplying device configured to supply fuel gas and oxidant gas to a fuel cell, includes a power generating operation step of performing a power generating operation for causing the fuel cell to generate power by controlling the fuel gas and the oxidant gas to be supplied to the fuel cell on the basis of a load required of the fuel cell. Further, the control method includes an autonomous operation step of performing an autonomous operation of the fuel cell when the load drops to or below a predetermined value. In the autonomous operation, power supply from the fuel cell system to the load is stopped and the fuel gas is passed to an anode of the fuel cell.

BRIEF DESCRIPTION OF DRAWINGS

FIG. 1 is a configuration diagram showing a main configuration of a fuel cell system in a first embodiment of the present invention, FIG. 8B is a conceptual diagram showing an example of a flow rate table showing flow rates of air and fuel to be supplied to a combustor in the case of increasing the temperature of the fuel cell.

DESCRIPTION OF EMBODIMENTS

Figure 2A:
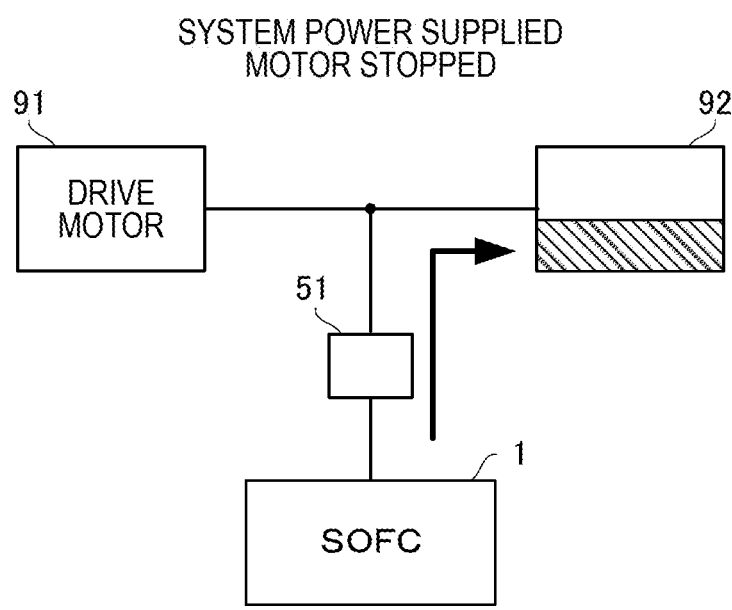
FIG. 2A is a conceptual diagram showing a state where a motor of a load device is in a stopped state and power is supplied to a battery by a fuel cell.

Hereinafter, embodiments of the present invention are described with reference to the accompanying drawings.

First Embodiment

FIG. 1 is a configuration diagram showing a main configuration of a fuel cell system 10 in a first embodiment of the present invention.

The fuel cell system 10 of the present embodiment is a solid oxide fuel cell system and, for example, a power supplying system for supplying power to a load device 90 installed in a vehicle.

The fuel cell system 10 includes a fuel cell stack 1 configured to generate power according to a load, a fuel supplying system 2 configured to supply anode gas (fuel gas) to the fuel cell stack 1 and an oxidant supplying system 3 configured to supply cathode gas (oxidant gas) to the fuel cell stack 1. Further, the fuel cell system 10 includes an exhausting system 4 configured to discharge anode off-gas (fuel off-gas) and cathode off-gas (oxidant off-gas) discharged from the fuel cell stack 1 to outside. Further, the fuel cell system 10 includes a power supplying system 5 configured to supply power from the fuel cell stack 1 to an external load device 90 and a control unit 6 configured to control an entire operation in the fuel cell system 10.

The fuel cell stack 1 is a solid oxide fuel cell (SOFC). The fuel cell stack 1 is formed by laminating a plurality of cells each configured such that an electrolyte layer formed of solid oxide such as ceramic is sandwiched by an anode electrode (fuel electrode) and a cathode electrode (air electrode). It should be noted that a material, which reacts with oxygen at a high temperature, is used for an anode electrode of the fuel cell stack 1, characteristics of the anode electrode are deteriorated by this oxidation reaction and power generation performance of the entire fuel cell stack is reduced.

Anode gas reformed by a reformer 26 is supplied to the anode electrode of the fuel cell stack 1 and air containing oxygen is supplied as cathode gas to a cathode electrode of the fuel cell stack 1. In the fuel cell stack 1, hydrogen contained in the anode gas and oxygen contained in the cathode gas are reacted to generate power and the anode off-gas and the cathode off-gas generated after the reaction are discharged to outside.

Thus, an anode gas, supply passage 22 and an anode gas discharge passage 29 constituting a passage in which the anode gas passes are connected to an anode-side manifold formed in the fuel cell stack 1, and a cathode gas supply passage 33 and a cathode gas discharge passage 39 constituting a passage in which the cathode gas passes are connected to a cathode-side manifold.

The anode gas supply passage 22 is a fuel passage for supplying the anode gas to the fuel cell stack 1, and the anode gas discharge passage 29 is a passage for introducing the anode off-gas discharged from the fuel cell stack 1 to an exhaust combustor 40. Further, the cathode gas supply passage 33 is an oxidant passage for supplying the cathode gas to the fuel cell stack 1 and the cathode gas discharge passage 39 is a passage for introducing the cathode off-gas discharged from the fuel cell stack 1 to the exhaust combustor 40.

The fuel supplying system 2 is a gas supplying device configured to supply the anode gas to the fuel cell stack 1. The fuel supplying system 2 includes a fuel tank 20, a pump 21, the anode gas supply passage 22, an anode flow rate control valve 23, an evaporator 24, a heat exchanger 25 and the reformer 26.

The fuel tank 20 stores liquid containing fuel. For example, reforming fuel formed from liquid obtained by mixing ethanol and water is stored in the fuel tank 20.

The pump 21 sucks the reforming fuel and supplies the reforming fuel at a fixed pressure to the fuel supplying system 2. The pump 21 and the fuel cell stack 1 are connected by the anode gas supply passage 22. The anode flow rate control valve 23, the evaporator 24, the heat exchanger 25 and the reformer 26 are arranged in the anode gas supply passage 22.

The anode flow rate control valve 23 causes the evaporator 24 to inject the reforming fuel from an unillustrated injection nozzle by supplying the reforming fuel supplied from the pump 21 to the injection nozzle.

The evaporator 24 vaporizes the reforming fuel, utilizing heat of discharged gas discharged from the exhaust combustor 40.

The heat exchanger 25 has heat supplied thereto from the exhaust combustor 40 and further heats the vaporized reforming fuel for reforming in the reformer 26.

The reformer 26 reforms the reforming fuel into anode gas containing hydrogen by a catalytic reaction and supplies the anode gas to the anode electrode of the fuel cell stack 1. In the reformer 26 of the present embodiment, steam reforming is performed to reform the fuel using steam. To perform steam reforming, at least 2 mol of steam (S) is necessary for 1 mol of carbon (C) contained in the reforming fuel. In such a situation where steam necessary for steam reforming is lacking, partial oxidation reforming is performed while fuel is burned using air instead of steam in the reformer 26.

A temperature sensor 61 is provided in the anode gas supply passage 22 located between the reformer 26 and the fuel cell stack 1.

The temperature sensor 61 detects a temperature of the anode gas to be supplied to the fuel cell stack 1. A detection value of the temperature sensor 61 is referred to as an "anode inlet temperature" below. The anode inlet temperature detected by the temperature sensor 61 is output to the control unit 6.

The oxidant supplying system 3 is a gas supplying device configured to supply the cathode gas to the fuel cell stack 1.

The oxidant supplying system 3 includes a filter 30, an air intake passage 31, a compressor 32, the cathode gas supply passage 33, a cathode flow rate control valve 34, a heating device 35, a reforming temperature control air passage 311 and a combustor air control valve 312. Further, the oxidant supplying system 3 includes an oxidation reforming passage 331 and an anode system air supply valve 341.

The filter 30 removes foreign matter in outside air and introduces the resultant outside air into the fuel cell system 10.

The air intake passage 31 is a passage for passing the air having the foreign matter removed therefrom by the filter 30 to the compressor 32. One end of the air intake passage 31 is connected to the filter 30 and the other end is connected to a suction port of the compressor 32.

The compressor 32 is an actuator for supplying the cathode gas to the fuel cell stack 1. In the present embodiment, the compressor 32 takes in outside air through the filter 30 and supplies the air to the fuel cell stack 1 and the like. It should be noted that although the compressor for feeding air under pressure is used in the present embodiment as the actuator for supplying the cathode gas to the fuel cell stack 1, the actuator only has to be a device capable of supplying the cathode gas to the fuel cell stack 1 and may be an air blower, a pump or another actuator.

The cathode flow rate control valve 34 is a control valve for controlling a flow rate of the cathode gas to be supplied to the fuel cell stack 1. For example, the cathode flow rate control valve 34 is constituted by an electromagnetic valve. An opening degree of the cathode flow rate control valve 34 can be changed in a stepwise manner and is controlled by the control unit 6.

The heating device 35 is a device for heating the cathode gas to be supplied to the fuel cell stack 1 so that a temperature of the cathode gas is suitable for power generation of the fuel cell stack 1. For example, the heating device 35 is realized by a heat exchanger for exchanging heat between supplied gas to the cathode of the fuel cell stack 1 and discharged gas from the fuel cell stack 1, a combustor for heating the supplied gas by burning the fuel gas, a combustor for heating the supplied gas utilizing heat of a catalytic reaction or the like.

A combustor air supply passage 332 is a passage for supplying air to the exhaust combustor 40 while bypassing the fuel cell stack 1. The combustor air supply passage 332 is a bypass passage branched from the cathode gas supply passage 33 and connected to the exhaust combustor 40. It should be noted that although the combustor air supply passage 332 is connected to the exhaust combustor 40 in the present embodiment, this passage may join the cathode gas discharge passage 39.

An air flow rate control valve 342 is a control valve for controlling a flow rate of air to be supplied to the exhaust combustor 40. An opening degree of the air flow rate control valve 342 is controlled by the control unit 6. The exhaust combustor 40 heats by burning the fuel gas and thus requires oxygen. Oxygen in the cathode off-gas may be lacking during a start-up operation and a power generating operation of the fuel cell system 10. Since it is difficult to sufficiently burn the anode off-gas in such a case, combustion promoting gas (oxygen) is supplied to the exhaust combustor 40 by opening the air flow rate control valve 342. In this way, unburned gas in the anode off-gas can be reliably burned in the exhaust combustor 40 during the start-up operation and the power generating operation of the fuel cell system 10.

The oxidation reforming passage 331 is an air passage provided to supplement air as an alternative to steam to the reformer 26 such as when steam necessary for a steam reforming reaction in the reformer 26 is lacking. The oxidation reforming passage 331 is a branch passage branched from the cathode gas supply passage 33 and joining a part of the anode gas supply passage 22 upstream of the reformer 26. In the present embodiment, one end of the oxidation reforming passage 331 is connected between the compressor 32 and the cathode flow rate control valve 34 and the other end is connected to the anode gas supply passage 22 located between the evaporator 24 and the heat exchanger 25.

The anode system air supply valve 341 is a control valve for supplying, to the anode gas supply passage 22, all or part of the air discharged from the compressor 32 to the cathode gas supply passage 33. In the present embodiment, the anode system air supply valve 341 supplies the air as an alternative to steam necessary for reforming in the reformer 26 to the anode gas supply passage 22. The anode system air supply valve 341 is, for example, constituted by an electromagnetic valve. An opening degree of the anode system air supply valve 341 can be changed in a stepwise manner and is controlled by the control unit 6.

The exhausting system 4 includes the anode gas discharge passage 29, the cathode gas discharge passage 39, the exhaust combustor 40 and an exhaust passage 41.

A temperature sensor 62 is provided in the anode gas discharge passage 29 located between the fuel cell stack 1 and the exhaust combustor 40. The temperature sensor 62 detects a temperature of the anode off-gas discharged from the fuel cell stack 1. A detection value of the temperature sensor 62 is referred to as an "anode outlet temperature" below. The anode outlet temperature detected by the temperature sensor 62 is output to the control unit 6.

The exhaust combustor 40 generates discharged gas mainly containing carbon dioxide and water by mixing the anode off-gas and the cathode off-gas and catalytically burning that mixture gas, and transfers heat by the catalytic combustion to the heat exchanger 25. The exhaust combustor 40 discharges post-combustion gas generated after combustion to the exhaust passage 41.

The exhaust passage 41 is a passage for discharging the post-combustion gas from the exhaust combustor 40 to outside air. The exhaust passage 41 passes through the evaporator 24 and is connected to an unillustrated muffler. In this way, the evaporator 24 is heated by the post-combustion gas from the exhaust combustor 40.

A temperature sensor 63 is provided in the exhaust passage 41 located between the exhaust combustor 40 and the evaporator 24. The temperature sensor 63 detects a temperature of the discharged gas (post-combustion gas) discharged from the exhaust combustor 40. A detection value of the temperature sensor 63 is referred to as a "combustor outlet temperature" below. The combustor outlet temperature detected by the temperature sensor 63 is output to the control unit 6.

The power supplying system 5 is a power supplying device connected between the fuel cell stack 1 and the load device 90 and configured to enable power to be supplied from the fuel cell stack 1 to the load device 90 by stepping up a voltage of the fuel cell stack 1 with respect to a voltage of the load device 90 so that the fuel cell stack 1 can supply a current. The power supplying system 5 includes a voltage sensor 50 and a DC/DC converter 51.

The voltage sensor 50 is connected between a positive electrode terminal and a negative electrode terminal of the fuel cell stack 1. The voltage sensor 50 detects a voltage generated in the fuel cell stack 1. A detection value of the voltage sensor 50 is referred to as a "stack voltage" below. The stack voltage detected by the voltage sensor 50 is output to the control unit 6.

The DC/DC converter 51 is a power controller for extracting generated power from the fuel cell stack 1. The DC/DC converter 51 is connected in parallel with the fuel cell stack 1, and supplies generated power to the load device 90 on a secondary side by stepping up an output voltage of the fuel cell stack 1 on a primary side. For example, the DC/DC converter 51 increases a voltage of several tens of V output from the fuel cell stack 1 to a voltage level of several hundreds of V so that power is supplied to the load device 90.

The load device 90 is an electrical load to be connected to the fuel cell system 10 and is, for example, an electrical component installed in the vehicle. The load device 90 includes a drive motor 91 and a battery 92.

The drive motor 91 is connected to each of the battery 92 and the DC/DC converter 51 via an unillustrated inverter. The drive motor 91 is a power source for driving the vehicle. Further, the drive motor 91 can generate regenerative power using a braking force necessary in the case of braking the vehicle and charge this regenerative power into the battery 92.

The battery 92 is a power supply source for supplying stored power to the drive motor 91. In the present embodiment, the battery 92 is a main power supply source and the fuel cell stack 1 is mainly used to charge the battery 92 when a charge amount of the battery 92 becomes low. Further, power of the fuel cell stack 1 may be supplied to the drive motor 91.

The control unit 6 is constituted by a general-purpose electronic circuit, including a microcomputer, a microprocessor and a CPU, and peripheral devices and performs a process for controlling the fuel cell system 10 by executing a specific program.

The control unit 6 receives signals output from various sensors such as the voltage sensor 50 and the temperature sensors 61 to 63 and controls an operating state of each of the fuel supplying system 2, the oxidant supplying system 3, the exhausting system 4 and the power supplying system 5 according to these signals.

Further, an operation unit 101 configured to output a start-up command signal or a stop command signal to the fuel cell system 10 is connected to the control unit 6. The operation unit 101 includes an EV key, outputs a start-up command signal to the control unit 6 when the EV key is turned on by an occupant and outputs a stop command signal to the control unit 6 when the EV key is turned off.

The control unit 6 performs a start-up operation for starting the fuel cell system 10 upon receipt of the start-up command signal from the operation unit 101 and performs a power generating operation for controlling power generation of the fuel cell stack 1 according to an operating state of the load device 90. It should be noted that the fuel cell system 10 may perform the start-up operation when the charge amount of the battery 92 drops to or below a predetermined value at which the battery 92 needs to be charged.

In the power generating operation, the control unit 6 obtains power required of the fuel cell stack 1 according to the operating state of the load device 90 and supplies the cathode gas and the anode gas to the fuel cell stack 1 at flow rates necessary for power generation of the fuel cell stack 1 on the basis of the required power. Then, the control unit 6 performs switching control on the DC/DC converter 51 to supply power output from the fuel cell system 10 to the load device 90.

Specifically, the control unit 6 controls a power generation amount of the fuel cell stack 1 by controlling the flow rates of the cathode gas and the anode gas to be supplied to the fuel cell stack 1 on the basis of the power required of the fuel cell stack 1. For example, the power required of the fuel cell stack 1 increases as an accelerator pedal is depressed more. Thus, the flow rates of the cathode gas and the anode gas to be supplied to the fuel cell stack 1 increase as the accelerator pedal is depressed more.

Further, in a system state where power supply from the fuel cell system 10 to the load device 90 is stopped with the EV key set to on, the control unit 6 performs an autonomous operation for suppressing power generation of the fuel cell stack 1 and maintaining the fuel cells in a state suitable for power generation. The system state where power supply from the fuel cell system 10 to the load device 90 is stopped is referred to as an "idle stop (IS) state" and the autonomous operation is referred to as an "IS operation" below.

When power required of the fuel cell stack 1 reaches a predetermined value, e.g. becomes zero, the operating state of the fuel cell system 10 is transitioned from the power generating operation to the IS operation and the control unit 6 stops power supply from the fuel cell system 10 to the load device 90 by controlling the DC/DC converter 51.

It should be noted that power generated by the fuel cell stack 1 may be supplied to an auxiliary machine as an accessory machine necessary to cause the fuel cell stack 1 to generate power or power supply from the fuel cell stack 1 to the auxiliary machine may be stopped during the IS operation. The compressor 32 is an example of the auxiliary machine of the fuel cell system 10.

In such a system as to supply power from the fuel cell stack 1 to the auxiliary machine during the IS operation, power supply from the fuel cell system 10 to the load device 90 is stopped, for example, when power required of the fuel cell stack 1 falls to or below a value of power necessary to drive the auxiliary machine or an actually measured value.

Further, upon receipt of a stop command signal from the operation unit 101, the control unit 6 performs a stop operation for stopping the operation of the fuel cell system 10.

FIG. 2 are diagrams showing patterns of power supply to the load device 90 in the fuel cell system 10 when the EV key is on.

FIG. 2A is a conceptual diagram showing a state where the drive motor 91 is in a stopped state and power is supplied from the fuel cell system 10 to the battery 92. The state shown in FIG. 2A possibly occurs when the vehicle is in a stopped state and the charge amount of the battery 92 is small.

Figure 2B:
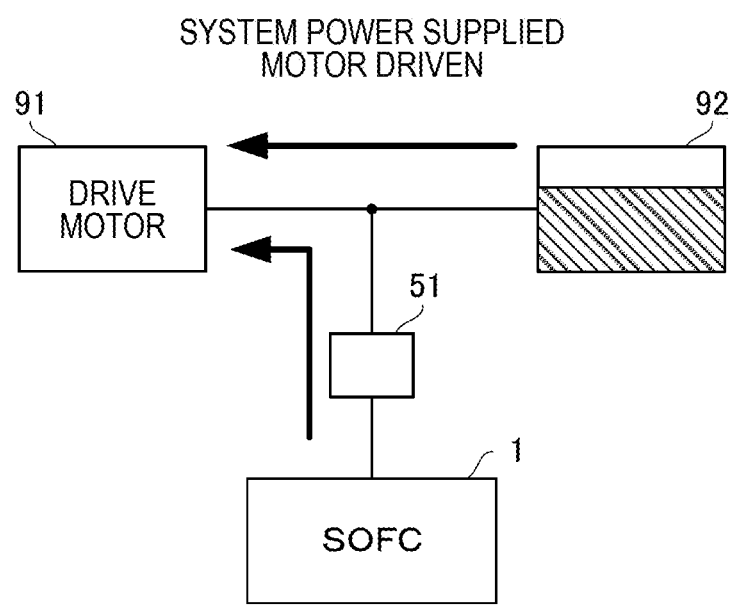
FIG. 2B is a conceptual diagram showing a state where the motor in a power running state and power is supplied to the motor by the fuel cell and the battery.

FIG. 2B is a conceptual diagram showing a state where the drive motor 91 is in a power running state and power is supplied from both the fuel cell system 10 and the battery 92 to the drive motor 91. The state shown in FIG. 2B possibly occurs when the vehicle is in a state of acceleration and driven in a state where a load (output) of the drive motor 91 is high.

Figure 2C:
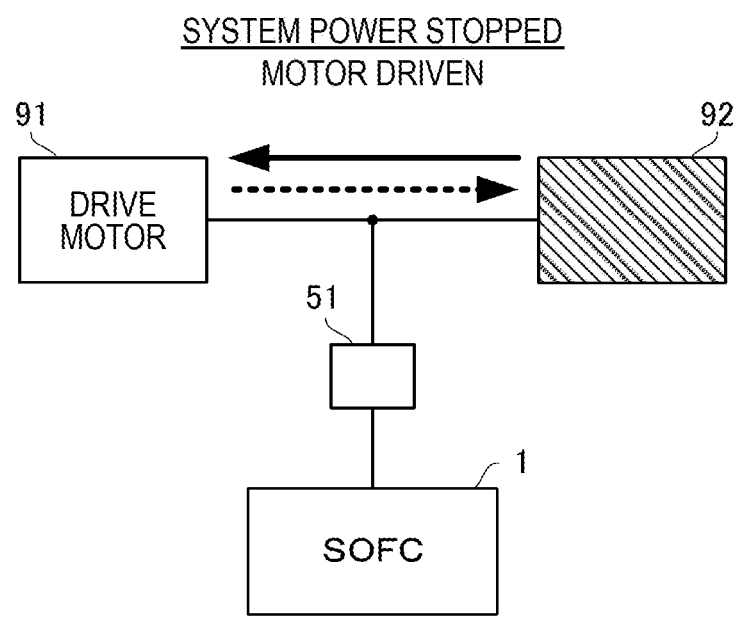
FIG. 2C is a conceptual diagram showing a state where the motor is in the power running state or a regenerative state and power supply from the fuel cell to the motor and the battery as the load device is stopped.

FIG. 2C is a conceptual diagram showing a state where the drive motor 91 is in the power running state or a regenerative state and power supply from the fuel cell system 10 to both the drive motor 91 and the battery 92 is stopped. The state shown in FIG. 2C possibly occurs when the drive motor 91 is in a state of being driven at a low or medium load during the travel of the vehicle and when the battery 92 is fully charged. Further, this state also possibly occurs when the vehicle is in a state of deceleration and the battery 92 has a marginal capacity to be charged with the regenerative power of the drive motor 91.

Figure 2D:
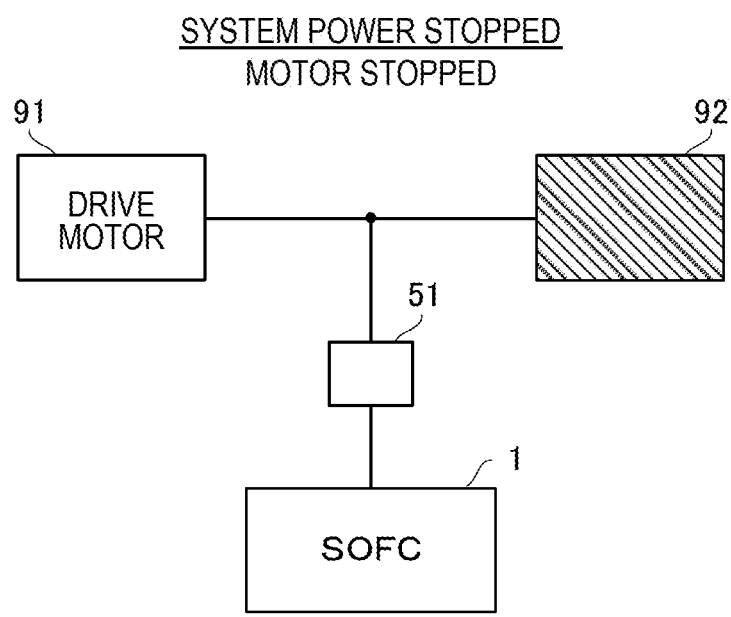
FIG. 2D is a conceptual diagram showing a state where the motor is in the stopped state and the battery is fully charged.

FIG. 2D is a conceptual diagram showing a state where the drive motor 91 is in the stopped state and the battery 92 is fully charged. The state shown in FIG. 2D possibly occurs when the vehicle is in the stopped state and the battery 92 is fully charged.

As just described, out of the states shown in FIGS. 2A to 2D, the states shown in FIGS. 2C and 2D, i.e. the system states where power supply from the fuel cell system 10 to both the drive motor 91 and the battery 92 is stopped, fall under the IS state.

Accordingly, the fuel cell system 10 possibly enters the IS state such as when the battery 92 is fully charged by a regenerating operation of the drive motor 91 during the travel of the vehicle or when the battery 92 is fully charged and the vehicle is running or stopped. In such cases, power required of the fuel cell stack 1 from the load device 90 becomes zero and the IS operation is performed.

During the IS operation, the supply of the anode gas to the fuel cell stack 1 is desirably stopped to suppress wasteful fuel consumption. However, if the supply of the anode gas to the fuel cell stack 1 is stopped, air permeates from the cathode electrode to the anode electrode in the fuel cell stack 1 with the passage of time. In such a situation, an oxidation reaction occurs at the anode electrode due to oxygen in the permeating air and power generation performance of the fuel cell system 10 is reduced.

As a measure against this, the control unit 6 of the present embodiment stops power supply from the fuel cell system 10 to the load device 90 and continues the supply of the anode gas to the fuel cell stack 1 when a switch is made from the power generating operation to the IS operation. Since an inflow of air from the cathode electrode to the anode electrode of the fuel cell stack 1 is suppressed during the IS operation in this way, the oxidation reaction occurring at the anode electrode can be suppressed.

Next, the operation of the fuel cell system 10 in the present embodiment is specifically described.

Figure 3:
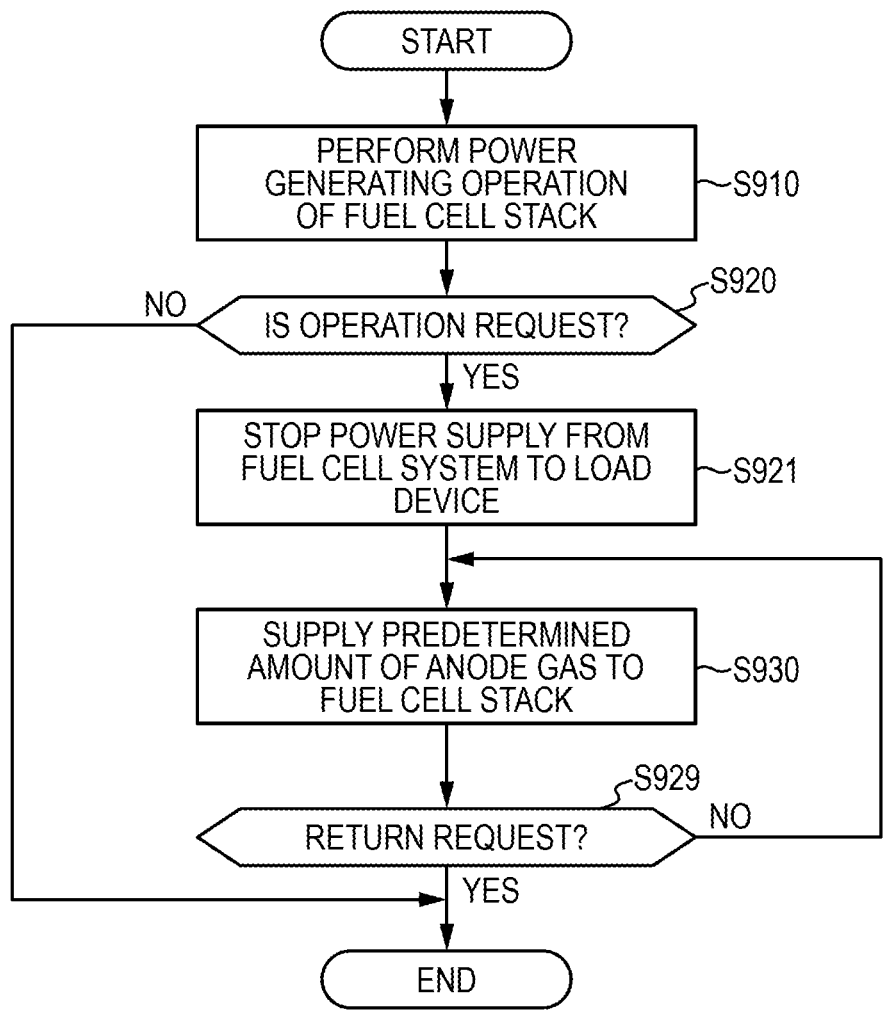
FIG. 3 is a flow chart showing an example of a control method for the fuel cell system in the first embodiment.

FIG. 3 is a flow chart showing a processing procedure example relating to a control method for the fuel cell system 10 in the present embodiment.

In Step S910, the control unit 6 controls power generation of the fuel cell stack 1 and performs the power generating operation for supplying power from the fuel cell system 10 to the load device 90 on the basis of power required of the fuel cell stack 1.

For example, the control unit 6 calculates a target value of each of the cathode gas flow rate and the anode gas flow rate necessary for power generation of the fuel cell stack 1 on the basis of the power required by the load device 90, using a map or calculation formula determined in advance.

Then, the control unit 6 drives the compressor 32 and opens the cathode flow rate control valve 34 on the basis of the target value of the cathode gas flow rate. In this way, air serving as the cathode gas is heated by the heating device 35 and supplied to the cathode electrode of the heated fuel cell stack 1. Along with this, the control unit 6 drives the pump 21 and opens the anode flow rate control valve 23 on the basis of the target value of the anode gas flow rate. In this way, the reforming fuel supplied from the fuel tank 20 is vaporized by the evaporator 24 and the vaporized reforming fuel is heated by the heat exchanger 25. The heated reforming fuel is reformed into the anode gas in the reformer 26 and this anode gas is supplied to the fuel cell stack 1.

In the fuel cell stack 1 having the anode gas and the cathode gas supplied thereto, power is generated by an electrochemical reaction and supplied to the DC/DC converter 51, and the anode off-gas and the cathode off-gas used in the electrochemical reaction are introduced to the exhaust combustor 40.

Further, the control unit 6 controls the opening degrees of the air flow rate control valve 342 and the fuel flow rate control valve 231 on the basis of the temperature of the fuel cell stack 1 so that the fuel cell stack 1 is maintained at a temperature suitable for power generation. Since this causes the temperature of the anode gas to increase due to combustion heat generated in the exhaust combustor 40, the fuel cell stack 1 is heated. Further, the control unit 6 opens the anode system air supply valve 341 in such a situation where steam in the fuel gas supplied to the reformer 26 is lacking. Since air is supplied from the anode system air supply valve 341 to the reformer 26 in this way, the reforming fuel is reformed into the anode gas by a partial oxidation reaction.

In Step S920, the control unit 6 judges whether or not an IS operation request has been received from the load device 90. The IS operation request is issued, for example, when the battery 92 is fully charged. Specifically, the IS operation request is issued when power required by the load device 90 becomes zero. If no IS operation request has been received, the control unit 6 finishes the processing procedure of the control method for the fuel cell system 10.

In Step S921, upon receipt of the IS operation request, the control unit 6 starts the IS operation of the fuel cell system 10 and stops power supply from the fuel cell system 10 to the load device 90 by controlling the operation of the DC/DC converter 51.

In Step S930, the control unit 6 supplies a predetermined amount of the anode gas to the fuel cell stack 1 after power supply from the fuel cell system 10 to the load device 90 is stopped.

The predetermined amount mentioned here is determined to suppress an inflow of oxygen from the cathode electrode to the anode electrode in the fuel cell stack 1. For example, a duration is determined in advance in consideration of an assumed duration of the IS operation, and the predetermined amount is set to suppress an inflow of oxygen to the anode electrode during the determined duration. In this case, the control unit 6 may temporarily increase an anode gas supply flow rate to the fuel cell stack 1 more than a predetermined amount every time the predetermined duration elapses. Alternatively, the control unit 6 may calculate an oxygen inflow amount to the anode electrode on the basis of each of the target values of the cathode gas flow rate and the anode gas flow rate and change the predetermined amount on the basis of the oxygen inflow amount.

In Step S929, the control unit 6 judges whether or not a return request has been received from the load device 90. The return request is issued, for example, when the battery 92 needs to be charged or when there is a possibility of insufficient power supply to the drive motor 91. Specifically, the return request is issued when the power required by the load device 90 becomes larger than zero.

Unless the return request has been received, the control unit 6 returns to Step S930 and repeatedly performs the processing of Step S930 until the return request is received from the load device 90. On the other hand, if the return request has been received, the control unit 6 finishes the IS operation and finishes the processing procedure of the control method. In this way, the operating state of the fuel cell system 10 transitions from the IS operation to the power generating operation and the power generating operation is performed in Step S910 in the next control cycle.

As just described, the control unit 6 continues to supply the anode gas to the fuel cell stack 1 after stopping power supply from the fuel cell system 10 to the load device 90 when performing the IS operation of the fuel cell system 10.

It should be noted that although the processing of Step S930 is performed after the processing of Step S921 is performed in the present embodiment, these processings may be simultaneously performed or the processing of Step S921 may be performed after the processing of Step S930 is performed.

Further, in the present embodiment, the control unit 6 may transition to the power generating operation after burning the unburned gas staying inside the reformer 26 and on the anode side of the fuel cell stack 1 in the exhaust combustor 40 after the processing of Step S929.

Further, the supply of the cathode gas to the fuel cell stack 1 may be continued or stopped when the IS operation of the fuel cell system 10 is performed. Specifically, in the present embodiment, the anode gas is passed through the fuel cell stack 1 regardless of a state of supply of the cathode gas to the fuel cell stack 1. It should be noted that air is preferably supplied through the combustor air supply passage 332 so that the anode gas passing through the fuel cell stack 1 can be properly burned in the exhaust combustor 40 in the case of stopping the supply of the cathode gas.

According to the first embodiment, the fuel cell system 10 includes the fuel supplying system 2 and the oxidant supplying system 3 configured to supply the anode gas and the cathode gas to the fuel cell stack 1. The control method for this fuel cell system 10 includes a power generating operation step of performing the power generating operation for causing the fuel cell stack 1 to generate power on the basis of a load required of the fuel cell stack 1 and an autonomous operation step of performing the IS operation (autonomous operation) for maintaining the state of the fuel cell stack 1 by suppressing power generation of the fuel cell stack 1 when the load drops to or below a predetermined value.

When the power generating operation is performed, the fuel cell system 10 controls power generation of the fuel cell stack 1 by supplying the anode gas and the cathode gas to the fuel cell stack 1 and supplies power from the fuel cell system 10 to the load device 90. When a switch is made from the power generating operation to the IS operation, the fuel cell system 10 stops power supply from the fuel cell system 10 to the load device 90 and supplies the anode gas to the anode electrode of the fuel cell stack 1.

By supplying the anode gas to the fuel cell stack 1 during the IS operation in this way, an inflow of oxygen from the cathode electrode to the anode electrode of the fuel cell stack 1 and a back flow of oxygen from the exhaust combustor 40 to the anode electrode can be simultaneously suppressed. Thus, the oxidation reaction at the anode electrode of the fuel cell stack 1 during the IS operation is suppressed, wherefore a reduction in power generation performance of the fuel cell stack 1 can be suppressed.

In addition, according to the present embodiment, the anode off-gas discharged from the fuel cell stack 1 can be burned in the exhaust combustor 40 and the temperature of the exhaust combustor 40 for heating the fuel cell stack 1 can be maintained. Thus, it is possible to shorten a time required to increase the temperature of the fuel cell stack 1 to an operating temperature suitable for power generation when return is made from the IS operation to the power generating operation. Specifically, a reduction of responsiveness at the next power generation of the fuel cell stack 1 can be suppressed.

Since the deterioration of the fuel cell stack 1 and a reduction of responsiveness can be simultaneously solved by passing the anode gas through the anode electrode of the fuel cell stack 1 during the IS operation as just described, a reduction in power generation performance of the fuel cell stack 1 during the IS operation can be suppressed.

Further, according to the present embodiment, the control unit 6 causes the unburned gas discharged from the anode electrode of the fuel cell stack 1 to the exhaust combustor 40 to be burned, for example, when return is made to the power generating operation, the stop operation or the like in a state where power supply from the fuel cell system 10 to the load device 90 is stopped. In this way, it is possible to reduce a discharge amount of the unburned gas discharged from the fuel cell system 10 to atmosphere when return is made from the IS operation.

Second Embodiment

Figure 4:
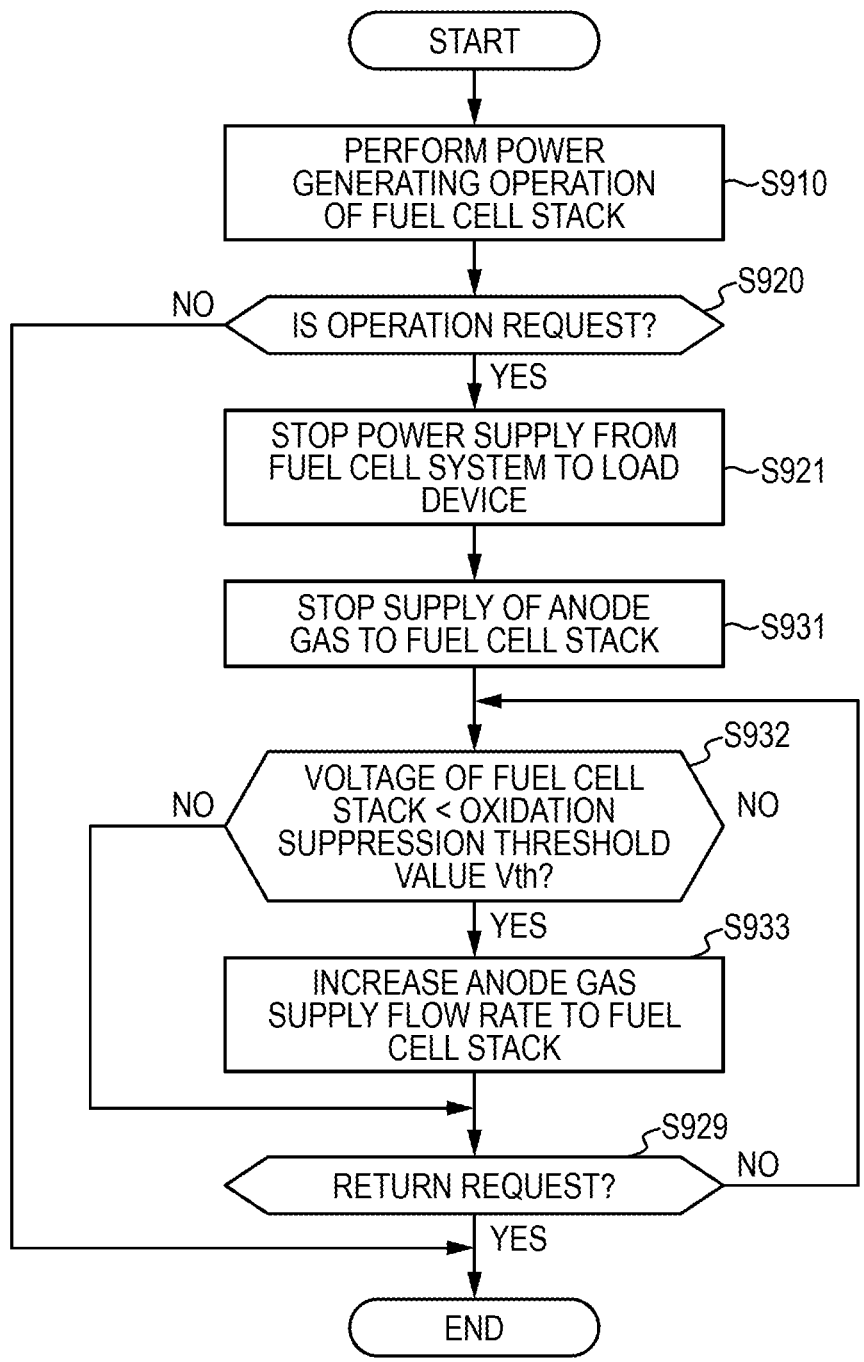
FIG. 4 is a flow chart showing an example of a control method for a fuel cell system in a second embodiment of the present invention.

FIG. 4 is a flow chart showing a processing procedure example relating to a control method for a fuel cell system 10 in a second embodiment of the present invention.

The fuel cell system 10 of the present embodiment has the same configuration as the fuel cell system 10 shown in FIG. 1. The same components as those of the fuel cell system 10 shown in FIG. 1 are denoted by the same reference signs and are not described in detail below.

The control method of the present embodiment includes Steps S931 to S933 instead of Step S930 shown in FIG. 3. Here, only a processing of each of Steps S931, S932 and S933 is described in detail.

When power supply from the fuel cell system 10 to a load device 90 is stopped in Step S921, advance is made to the processing of Step S931.

In Step S931, a control unit 6 stops the supply of anode gas to a fuel cell stack 1 to suppress fuel consumption. In the present embodiment, the control unit closes an anode flow rate control valve 23 to stop the supply of the anode gas to the fuel cell stack 1.

In Step S932, the control unit 6 judges according to a state of the fuel cell stack 1 whether or not power generation performance of the fuel cell stack 1 will be reduced. Examples of a parameter indicating the state of the fuel cell stack 1 include a temperature of the fuel cell stack 1 and an oxygen inflow amount to an anode electrode.

In the present embodiment, the control unit 6 obtains a stack voltage from a voltage sensor 50 and judges whether or not the stack voltage has dropped below an oxidation suppression threshold value Vth. As the amount of oxygen leaking from a cathode electrode to the anode electrode in the fuel cell stack 1 increases, a hydrogen concentration in the anode gas decreases and an output voltage of the fuel cell stack 1 decreases. By utilizing such a property, an inflow amount of oxygen from the cathode electrode to the anode electrode can be grasped.

As just described, the oxidation suppression threshold value Vth is a voltage value indicating that the hydrogen concentration decreases and the anode electrode is deteriorated due to an increase of oxygen concentration in the anode electrode of the fuel cell stack 1. Specifically, the oxidation suppression threshold value Vth is a predetermined voltage value indicating a reduction in fuel gas concentration of the anode electrode in the fuel cell stack 1. The oxidation suppression threshold value Vth is set at a voltage valve within a range where power generation performance of the fuel cell stack 1 is not reduced, for example, through experimental data, simulation or the like.

The control unit 6 determines that an oxidation reaction of the anode electrode has not advanced and proceeds to the processing of Step S929 if the stack voltage is equal to or higher than the oxidation suppression threshold value Vth.

In Step S933, the control unit 6 increases an anode gas supply amount by supplying the anode gas to the fuel cell stack 1 if the stack voltage is lower than the oxidation suppression threshold value Vth.

In the present embodiment, the control unit 6 opens the anode flow rate control valve 23 so that the anode gas flows to the fuel cell stack 1. Since oxygen leaking to the anode electrode can be pushed out in this way, the stack voltage can be increased.

If the stack voltage increases to a predetermined target value higher than the oxidation suppression threshold value Vth, the control unit 6 closes the anode flow rate control valve 23. In this way, fuel consumption in the fuel cell system 10 can be suppressed. It should be noted that although the anode flow rate control valve 23 is closed when the stack voltage increases to the target value in the present embodiment, the anode flow rate control valve 23 may be closed when an elapsed time from the start of the anode gas supply becomes a predetermined period.

If a return request has not yet been received from the load device 90 in Step S929, return is made to the processing of Step S932 and the anode gas is supplied to the fuel cell stack 1 if the stack voltage is lower than the oxidation suppression threshold value Vth. Specifically, the control unit 6 intermittently supplies the anode gas to the fuel cell stack 1 during the IS operation.

If the return request has been received in Step S929, the intermittent supply of the anode gas is stopped and the IS operation is finished.

According to the second embodiment, the control unit 6 increases the amount of the anode gas to be supplied to the fuel cell stack 1 when the predetermined period elapses after the supply of the anode gas to the fuel cell stack 1 is stopped. In this way, the oxidation of the anode electrode in the fuel cell stack 1 can be suppressed while fuel consumption is suppressed.

In the present embodiment, the control unit 6 controls a flow rate of the anode gas to be supplied to the fuel cell stack 1 on the basis of the stack voltage (voltage of the fuel cell stack 1) when power supply to the load device 90 is stopped. In this way, the anode gas is precisely supplied to the fuel cell stack 1 as compared to a configuration for increasing an anode gas supply flow rate according to a length of a duration. Thus, the oxidation of the anode electrode can be properly suppressed while fuel consumption is suppressed.

Further, according to the present embodiment, the control unit 6 increases the flow rate of fuel gas to be supplied to the anode electrode when the stack voltage drops below the predetermined voltage value (oxidation suppression threshold value) Vth indicating a reduction of the fuel gas concentration in the anode electrode of the fuel cell stack 1. The predetermined voltage value Vth mentioned here is a voltage value indicating that the hydrogen concentration decreases and the anode is deteriorated due to an increase in oxygen concentration of the anode electrode in the fuel cell stack 1.

By supplying or increasing the fuel gas to the anode electrode according to the stack voltage in this way, the fuel gas is supplied to the anode electrode from the anode flow rate control valve 23 by way of a reformer 26 when the fuel gas concentration in the anode electrode decreases. Therefore, the oxidation of the anode electrode can be suppressed while wasteful fuel injection is suppressed.

Third Embodiment

Figure 5:
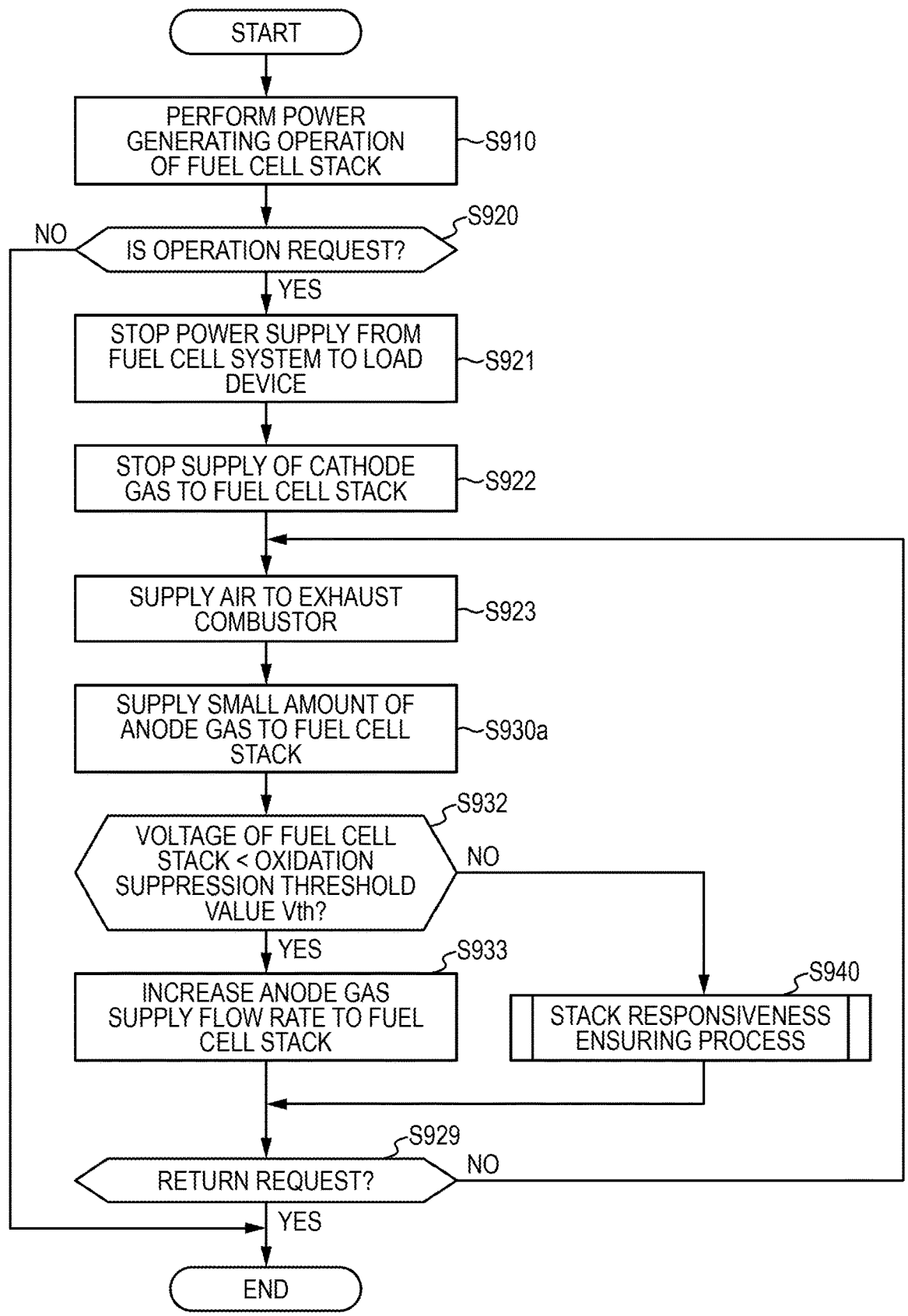
FIG. 5 is a flow chart showing an example of a control method for a fuel cell system in a third embodiment of the present invention.

FIG. 5 is a flow chart showing a processing procedure example relating to a control method for a fuel cell system 10 in a third embodiment of the present invention.

The control method of the present embodiment includes Steps S922, S923 and S940 in addition to each processing of the control method shown in FIG. 4 and includes Step S930a instead of Step S931. Here, only a processing of each of Steps S922, S923, S930a and S940 is described in detail.

In Step S922, a control unit 6 stops the supply of cathode gas to a fuel cell stack 1 in a state where power supply from a fuel cell system 10 to a load device 90 is stopped. In the present embodiment, the control unit 6 closes a cathode flow rate control valve 34 when power supply from the fuel cell system 10 to the load device 90 is stopped. Since power generation of the fuel cell stack 1 is stopped in this way, wasteful anode gas consumption can be reduced by suppressing wasteful power generation.

Further, since a pressure at a cathode electrode in the fuel cell stack 1 decreases by stopping the supply of air to the cathode electrode, an inflow of oxygen from the cathode electrode to an anode electrode can be suppressed. In addition to this, since heat inside the fuel cell stack 1 is not discharged to outside by air, a temperature reduction of the fuel cell stack 1 can be suppressed.

In Step S923, the control unit 6 supplies air to an exhaust combustor 40 within such a range that a temperature of the exhaust combustor 40 does not excessively drop below an operating temperature suitable for burning after the supply of the cathode gas to the fuel cell stack 1 is stopped. In the present embodiment, the control unit 6 continues to drive a compressor 32 and opens an air flow rate control valve 342 in a combustor air supply passage 332. An opening degree of the air flow rate control valve 342 is set such that an air flow rate to the exhaust combustor 40 becomes a flow rate necessary to burn anode off-gas from the fuel cell stack 1.

By supplying air to the exhaust combustor 40 in this way, unburned gas discharged from the anode electrode of the fuel cell stack 1 can be burned in the exhaust combustor 40 and the discharge of the unburned gas from the fuel cell system 10 to atmosphere can be suppressed. Further, the temperature of reforming fuel increases by the combustion of the unburned gas in the exhaust combustor 40 and, accordingly, the temperature of the anode gas increases as the reforming fuel is reformed into the anode gas. Thus, a temperature reduction of the fuel cell stack 1 can be suppressed.

In Step S930a, the control unit 6 supplies a small amount of the anode gas to the fuel cell stack 1. In the present embodiment, the control unit 6 opens an anode flow rate control valve 23 so that an anode gas supply flow rate to the fuel cell stack 1 becomes smaller than a flow rate during a power generating operation.

By causing a small amount of the anode gas to flow to the anode electrode in this way, an inflow of oxygen to the anode electrode is suppressed and a time required for a stack voltage to decrease to an oxidation suppression threshold value Vth becomes longer. Thus, a chance of increasing the anode gas supply flow rate can be reduced. Therefore, fuel economy can be improved while the oxidation of the anode electrode is suppressed.

In Step S940, the control unit 6 performs a stack responsiveness ensuring process for ensuring responsiveness at the next power generation in the fuel cell stack 1 if the stack voltage is equal to or higher than the oxidation suppression threshold value Vth. It should be noted that the stack responsiveness ensuring process is described in detail with reference to FIG. 6.

When the stack responsiveness ensuring process is finished in Step S940, the presence or absence of a return request is confirmed, return is made to the processing of Step S923 and an IS operation is continued if the return request has not been issued yet, and the IS operation is finished when the return request is issued.

Figure 6:
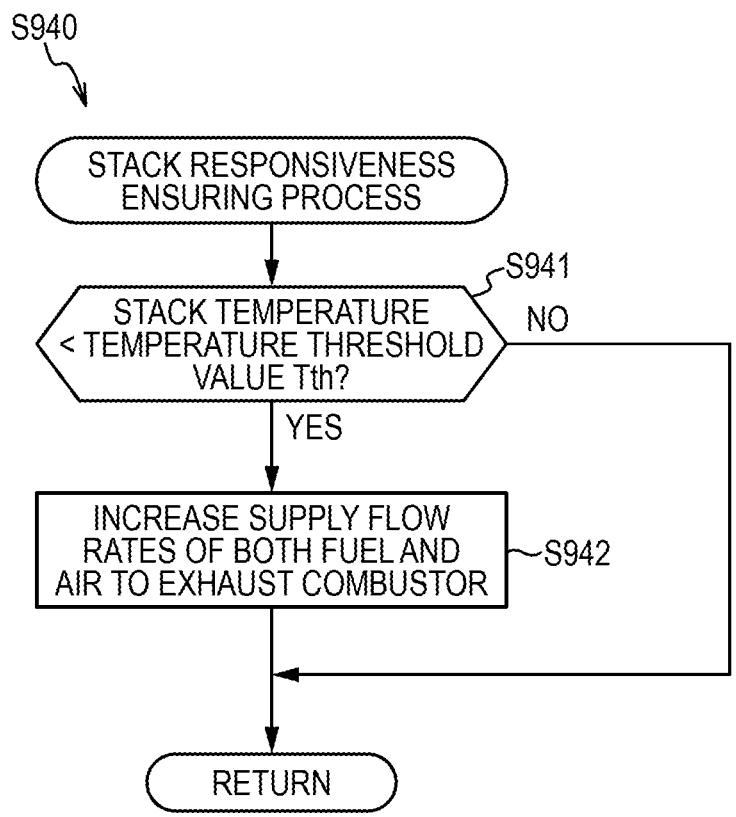
FIG. 6 is a flow chart illustrating contents of a responsiveness ensuring process for ensuring the responsiveness of the fuel cell during an IS operation performed by the control method for the fuel cell system, FIG. 7 are time charts showing an example of a control technique relating to the IS operation of the fuel cell system in the third embodiment.

FIG. 6 is a flow chart showing a processing procedure example relating to the stack responsiveness ensuring process performed in Step S940.

In Step S941, the control unit 6 judges whether or not a temperature of the fuel cell stack 1 is lower than a temperature threshold value Tth. An anode inlet temperature detected by a temperature sensor 61, an anode outlet temperature detected by a temperature sensor 62 and the like can be, for example, used as the temperature of the fuel cell stack 1. Alternatively, the fuel cell stack 1 may be provided with a temperature sensor and a detection value of that temperature sensor may be used. The temperature of the fuel cell stack 1 is merely referred to as a "stack temperature" below.

In the present embodiment, the control unit 6 obtains the anode inlet temperature as the stack temperature from the temperature sensor 61 and judges whether or not the stack temperature is lower than the temperature threshold value Tth. By using the anode inlet temperature as the stack temperature, the amount of heat generation of the exhaust combustor 40 can be accurately specified. Further, the temperature threshold value Tth is set on the basis of a temperature characteristic of power generation performance of the fuel cell stack 1. For example, the temperature threshold value Tth is set at about 600° C.

A series of processing procedures for the stack responsiveness ensuring process is finished if the stack temperature is equal to or higher than the temperature threshold value Tth.

In Step S942, the control unit 6 increases an air supply flow rate and a fuel supply flow rate to the exhaust combustor 40 to increase a combustion amount of the exhaust combustor 40 if the stack temperature drops below the temperature threshold value Tth. Since the temperature of the exhaust combustor 40 increases to increase the temperature of the anode gas to the fuel cell stack 1 in this way, the stack temperature becomes higher than the temperature threshold value Tth and increases to an operating temperature suitable for power generation of the fuel cell stack 1.

When the processing of Step S942 is finished, the control unit 6 finishes the stack responsiveness ensuring process, returns to the processing procedure of the control method shown in FIG. 5 and proceeds to the processing of Step S929.

Figure 7:
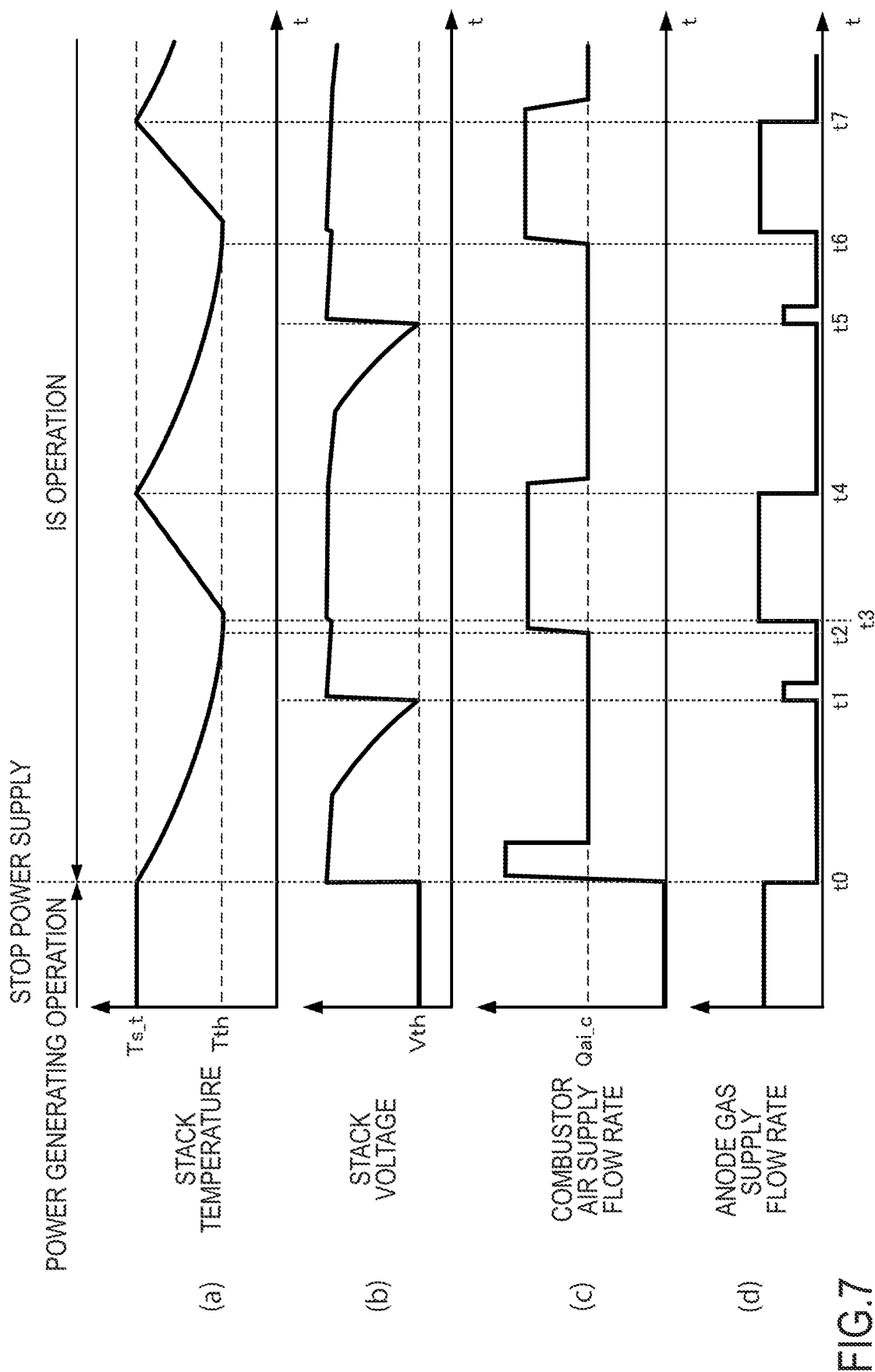

FIG. 7 are time charts showing a control technique for the IS operation in the present embodiment.

FIG. 7(a) is a chart showing a change of the stack temperature. FIG. 7(b) is a chart showing a change of the stack voltage correlated with a hydrogen concentration of the anode electrode. FIG. 7(c) is a chart showing a change of the flow rate of air to be supplied to the exhaust combustor 40 by the air flow rate control valve 342. FIG. 7(d) is a chart showing a change of the flow rate of the anode gas to be supplied to the exhaust combustor 40 through the fuel cell stack 1 by the anode flow rate control valve 23. A horizontal axis of each of FIGS. 7(a) to 7(d) is a common time axis.

At time t0, the control unit 6 starts the IS operation and stops power supply from the fuel cell system 10 to the load device 90 by controlling a DC/DC converter 51, for example, because a battery 92 is fully charged and an IS operation request has been issued from the load device 90. Since no more current flows from the fuel cell stack 1 to the load device 90 in this way, the stack voltage increases as shown in FIG. 7(b).

In a state where power supply from the fuel cell system 10 to the load device 90 is stopped, the control unit 6 slightly opens the anode flow rate control valve 23 without fully closing this valve. In this way, as shown in FIG. 7(d), a smaller amount of the anode gas than the anode gas supply flow rate during the power generating operation flows to the anode electrode of the fuel cell stack 1. By causing the anode gas to flow to the anode electrode of the fuel cell stack 1, an inflow of oxygen from the cathode electrode to the anode electrode is suppressed, wherefore the oxidation of the anode electrode can be suppressed.

Further, the control unit 6 closes the cathode flow rate control valve 34 when power supply from the fuel cell system 10 to the load device 90 is stopped. Since the supply of the cathode gas to the fuel cell stack 1 is stopped in this way, power generation of the fuel cell stack 1 is stopped. Thus, fuel consumption associated with power generation can be suppressed. Further, since a pressure at the cathode electrode in the fuel cell stack 1 decreases, the inflow of oxygen from the cathode electrode to the anode electrode can be further suppressed.

Further, the control unit 6 opens the air flow rate control valve 342 for supplying air to the exhaust combustor 40 while bypassing the fuel cell stack 1 when closing the cathode flow rate control valve 34. In this way, as shown in FIG. 7(c), air is supplied to the exhaust combustor 40. Thus, the anode gas discharged to the exhaust combustor 40 through the fuel cell stack 1 can be properly burned. By burning the anode gas, the temperature of the exhaust combustor 40 increases and the temperature of the small amount of the anode gas increases, wherefore a temperature reduction of the fuel cell stack 1 can be suppressed.

In FIG. 7(c), the air supply flow rate from the air flow rate control valve 342 to the exhaust combustor 40 is larger than a flow rate necessary to burn the anode off-gas. The reason for this is that a certain time is required for air to reach the exhaust combustor 40 from the air flow rate control valve 342 after the air flow rate control valve 342 is opened since the air flow rate control valve 342 has been closed before time t0.

Thus, the control unit 6 opens the air flow rate control valve 342 only for a specific period so that air flows at a flow rate higher than an air flow rate $Qai\_c$ sufficient to burn the anode gas passing through the fuel cell stack 1 when the IS operation is started. In this way, the shortage of air due to a delay in air supply to the exhaust combustor 40 immediately after the start of the IS operation can be avoided.

After the air supply flow rate to the exhaust combustor 40 is reduced to the flow rate necessary for combustion, the hydrogen concentration decreases and the stack voltage largely decreases due to an increase of oxygen concentration in the anode electrode as shown in FIG. 7(b). This is caused by an increase in the amount of air flowing from the cathode electrode to the anode electrode.

At time t1, the control unit 6 increases the opening degree of the anode flow rate control valve 23 for a predetermined period to increase the anode gas supply flow rate to the fuel cell stack 1 since the stack voltage has dropped to the oxidation suppression threshold value Vth. Since oxygen present in the anode electrode of the fuel cell stack 1 is discharged to outside in this way, the hydrogen concentration increases and the stack voltage increases as shown in FIG. 7(b).

At time t2, the control unit 6 increases the opening degree of the air flow rate control valve 342 to increase the amount of heat generation of the exhaust combustor 40 since the stack temperature has dropped to the temperature threshold value Tth as shown in FIG. 7(a). In this way, the air supply flow rate to the exhaust combustor 40 is increased as shown in FIG. 7(c).

At time t3, the control unit 6 increases the opening degree of the anode flow rate control valve 23 to increase the amount of heat generation of the exhaust combustor 40. In this way, as shown in FIG. 7(d), the anode gas supply flow rate to the exhaust combustor 40 further increases more than the supply flow rate increased at time t1.

Thus, the temperature of the exhaust combustor 40 increases, wherefore the temperature of the anode gas discharged from the reformer 26 increases. Since the heated anode gas flows into the fuel cell stack 1 along with this, the stack temperature gradually increases as shown in FIG. 7(a).

Since the stack temperature increases to a target temperature $Ts\_t$ at time t4 as shown in FIG. 7(a), the control unit 6 returns the opening degree of the air flow rate control valve 342 to an initial value after returning the opening degree of the anode flow rate control valve 23 to an initial value. Since a temperature suitable for power generation of the fuel cell stack 1 is ensured in this way, power can be quickly supplied from the fuel cell stack 1 to the load device 90 when a switch is made from the IS operation to the power generating operation.

Similarly, the anode gas supply flow rate to the fuel cell stack 1 is increased when the stack voltage drops to the oxidation suppression threshold value Vth at time t5. After the stack voltage increases, the air supply flow rate and the anode gas supply flow rate to the exhaust combustor 40 are increased until time t7 when the stack temperature drops to the temperature threshold value Tth at time t6.

It should be noted that although an example of increasing the anode gas supply flow rate to the fuel cell stack 1 during a stack temperature increasing period from time t3 to time t4 is illustrated here, the fuel supply flow rate from the fuel flow rate control valve 231 to the exhaust combustor 40 may be increased during the stack temperature increasing period.

Further, although an example of setting the air supply flow rate and the anode gas supply flow rate to the exhaust combustor 40 to fixed values during the stack temperature increasing period is illustrated here, there is no limitation to this example. Another control technique for the air supply flow rate and the anode gas supply flow rate to the exhaust combustor 40 during the stack temperature increasing period is described below.

Figure 8A:
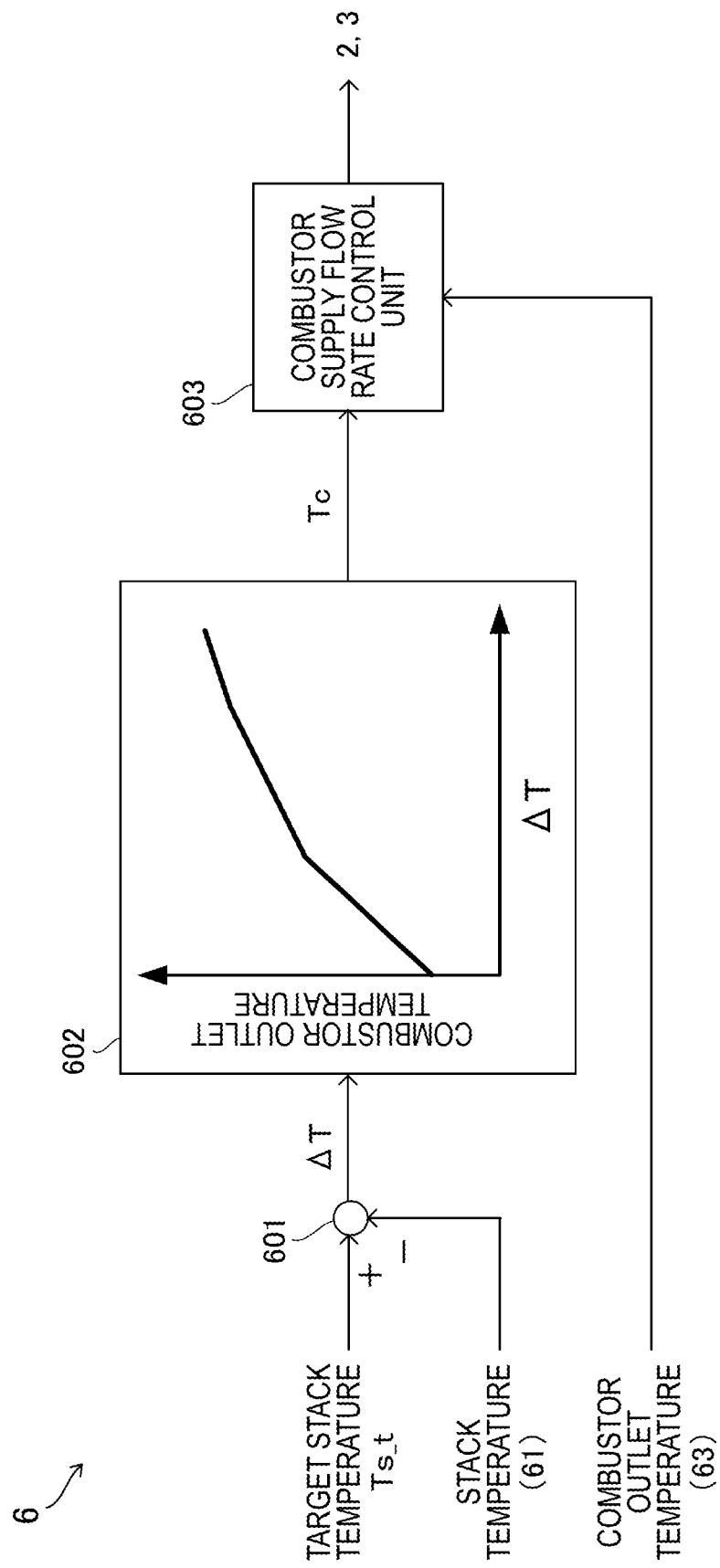
FIG. 8A is a chart showing an example of a functional configuration for maintaining a temperature of the fuel cell during the IS operation.

FIG. 8A is a block diagram showing another example relating to the control technique of increasing the stack temperature from the temperature threshold value Tth to the target temperature Ts_t during the IS operation.

The control unit 6 includes a subtraction unit 601, a combustor outlet temperature calculation unit 602 and a combustor supply flow rate control unit 603.

The subtraction unit 601 calculates a temperature difference ΔT by subtracting the stack temperature detected by the temperature sensor 61 from the target stack temperature Ts_t if the stack temperature is below the temperature threshold value Tth in Step S941 of FIG. 6. The subtraction unit 601 outputs the calculated temperature difference ΔT to the combustor outlet temperature calculation unit 602.

A temperature map determined in advance is recorded in the combustor outlet temperature calculation unit 602. The combustor outlet temperature calculation unit 602 refers to the temperature map and calculates a target value of the combustor outlet temperature associated with the temperature difference ΔT when obtaining the temperature difference ΔT from the subtraction unit 601. The combustor outlet temperature calculation unit 602 outputs the target value as a target outlet temperature Tc to the combustor supply flow rate control unit 603.

The aforementioned temperature map is such that the target value of the combustor outlet temperature increases as the temperature difference ΔT increases as shown inside the combustor outlet temperature calculation unit 602. Further, an increase rate of the target value becomes smaller as the temperature difference ΔT increases. In this way, the temperature of the fuel cell stack 1 can be quickly increased when the temperature difference ΔT is large, and an excessive temperature increase of the fuel cell stack 1 can be avoided when the temperature difference ΔT is small.

The combustor supply flow rate control unit 603 obtains the target outlet temperature Tc from the combustor outlet temperature calculation unit 602 and sets each of a target fuel flow rate of the fuel and a target air flow rate of air to be supplied to the exhaust combustor 40 on the basis of the target outlet temperature Tc, using a flow rate table determined in advance. In the present embodiment, the combustor supply flow rate control unit 603 opens the anode flow rate control valve 23 so that the fuel supply flow rate to the exhaust combustor 40 becomes the target fuel flow rate and opens the air flow rate control valve 342 so that the air supply flow rate to the exhaust combustor 40 becomes the target air flow rate.

FIG. 8B is a conceptual diagram showing an example of the flow rate table recorded in the combustor supply flow rate control unit 603.

As shown in FIG. 8B, the target air flow rate and the target fuel flow rate to the exhaust combustor 40 are set for each combustor target outlet temperature.

A combustor target fuel flow rate is set at a value necessary to achieve the combustor target outlet temperature, and a combustor target air flow rate is set such that a ratio ($C/O_2$) of a molar amount of carbon (C) to a molar amount of oxygen ($O_2$) becomes larger than 1. Specifically, the combustor target air flow rate is set according to the combustor target fuel flow rate and set at a value at which the anode off-gas, which is fuel to be supplied to the exhaust combustor 40, can be sufficiently burned.

Concerning the combustor target outlet temperature, values of a first target outlet temperature Tc1, a second target outlet temperature Tc2 and a third target outlet temperature Tc3 become larger in this order. Thus, values of a first target air flow rate Qai1, a second target air flow rate Qai2 and a third target air flow rate Qai3 become larger in this order concerning the combustor target air flow rate, and values of a first target fuel flow rate Qfu1, a second target fuel flow rate Qfu2 and a third target fuel flow rate Qfu3 become larger in this order concerning the combustor target fuel flow rate.

For example, the first target outlet temperature Tc1 is a target value of the outlet temperature of the exhaust combustor 40 set by the combustor outlet temperature calculation unit 602 when the stack temperature drops below the temperature threshold value Tth. The target fuel flow rate Qfu1 is a fuel supply flow rate to the exhaust combustor 40 necessary to achieve the target outlet temperature Tc1, and the target air flow rate Qai1 is an air supply flow rate to the exhaust combustor 40 to enable complete combustion in the exhaust combustor 40 for the target fuel flow rate Qfu1.

Accordingly, the combustor supply flow rate control unit 603 obtains the first target outlet temperature Tc1 and calculates the first target fuel flow rate Qfu1 and the first target air flow rate Qai1 associated with the first target outlet temperature Tc1 when the stack temperature drops below the temperature threshold value Tth. Then, the combustor supply flow rate control unit 603 opens the anode flow rate control valve 23 so that the fuel supply flow rate to the exhaust combustor 40 reaches the first target fuel flow rate Qf1 and opens the air flow rate control valve 342 so that the air supply flow rate to the exhaust combustor 40 reaches the first target air flow rate Qai1.

Thereafter, the combustor supply flow rate control unit 603 obtains the combustor outlet temperature from the temperature sensor 63, and calculates the second target fuel flow rate Qfu2 and the second target air flow rate Qai2 associated with the second target outlet temperature Tc2 when the combustor outlet temperature increases to the second target outlet temperature Tc2. Then, the combustor supply flow rate control unit 603 opens the anode flow rate control valve 23 and the air flow rate control valve 342 on the basis of the calculated second target fuel flow rate Qfu2 and second target air flow rate Qai2.

By increasing the outlet temperature of the exhaust combustor 40 to the target outlet temperature Tc3 in a stepwise manner in this way, the stack temperature can be increased to the temperature Ts_t suitable for power generation.

According to the third embodiment, the control unit 6 stops the supply of the cathode gas to the fuel cell stack 1 when power supply from the fuel cell system 10 to the load device 90 is stopped in the IS operation. Since power generation of the fuel cell stack 1 is stopped during the IS operation in this way, fuel economy can be improved. Further, since the inside of the fuel cell stack 1 is no longer cooled by air for the cathode gas, a temperature reduction of the fuel cell stack 1 can be suppressed. Further, since a pressure on the cathode side of the fuel cell stack 1 decreases by stopping the supply of the cathode gas to the fuel cell stack 1 and, along with this, an inflow of oxygen from the cathode electrode to the anode electrode is suppressed, the oxidation of the anode electrode can be suppressed.

Further, according to the present embodiment, the fuel cell system 10 further includes the exhaust combustor 40 for heating the anode gas to be supplied to the fuel cell stack 1 by burning the gas discharged from the anode electrode of the fuel cell stack 1. The control unit supplies a predetermined amount of the anode gas to the fuel cell stack 1 and supplies air to the exhaust combustor 40 in the IS operation.

In this way, the anode off-gas discharged from the fuel cell stack 1 can be burned in the exhaust combustor 40 and the temperature of the exhaust combustor 40 for heating the fuel cell stack 1 can be maintained. Thus, a temperature reduction of the fuel cell stack 1 during the IS operation is suppressed, wherefore a time required to increase the temperature of the fuel cell stack 1 to the operating temperature suitable for power generation when return is made from the IS operation to the power generating operation can be shortened. Specifically, a reduction of responsiveness at the next power generation of the fuel cell stack 1 can be suppressed.

Further, according to the present embodiment, the control unit 6 supplies a small amount of the anode gas to the fuel cell stack 1 in the IS operation and increases the amount of the anode gas to be supplied to the fuel cell stack 1 when a predetermined period elapses. By intermittently increasing the anode gas supply flow rate to the fuel cell stack 1 in this way, the oxidation of the anode electrode of the fuel cell stack 1 can be suppressed and a reduction of responsiveness at the next power generation can be suppressed.

Particularly, according to the present embodiment, the control unit 6 controls the flow rate of the anode gas to be supplied to the fuel cell stack 1 according to the state of the fuel cell stack 1 when power supply from the fuel cell system 10 to the load device 90 is stopped. Specifically, as shown in FIG. 7, the control unit 6 increases the anode gas supply flow rate to the exhaust combustor 40 when the temperature of the fuel cell stack 1 drops below the predetermined threshold value Tth for ensuring the temperature necessary for power generation of the fuel cell stack 1. In this way, the temperature of the fuel cell stack 1 can be properly maintained.

Further, according to the present embodiment, the control unit 6 makes an increase rate of the anode gas supply flow rate larger and increases the air supply flow rate to the exhaust combustor 40 when the stack temperature drops during the IS operation. For example, as shown in FIG. 7(d), the control unit 6 makes the increase rate of the anode gas supply flow rate at time t3 larger than that when the stack voltage decreases at time t1, and increases the air supply flow rate to the exhaust combustor 40.

Since the amount of heat generation of the exhaust combustor 40 increases in this way, the stack temperature can be quickly increased. Further, since the anode gas supply flow rate increases, an inflow of oxygen from the cathode electrode to the anode electrode can be further suppressed.

Fourth Embodiment

Figure 9:
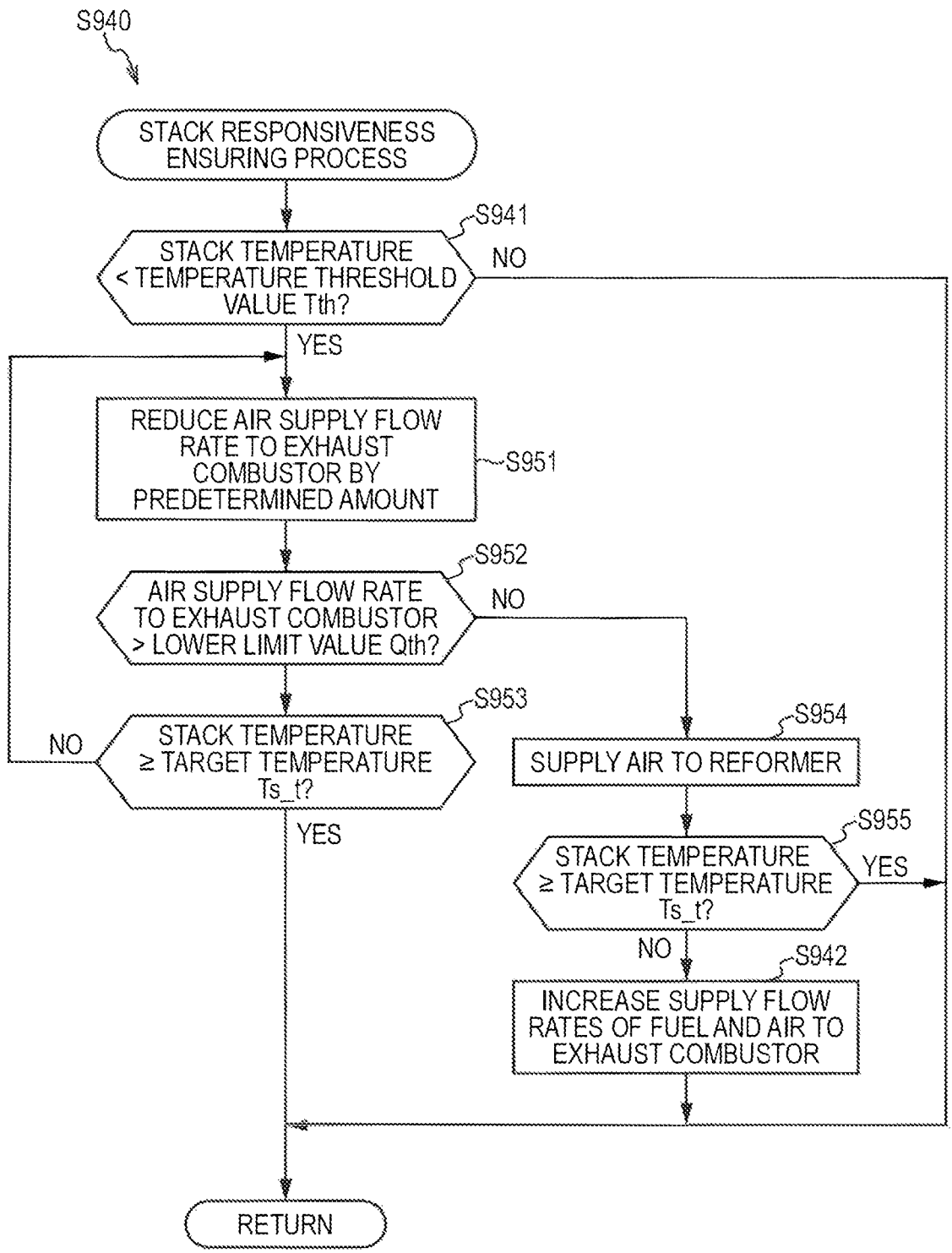
FIG. 9 is a flow chart illustrating a responsiveness ensuring process of a fuel cell in a fourth embodiment of the present invention.

FIG. 9 is a flow chart showing a processing procedure example relating to a stack responsiveness ensuring process in a fourth embodiment of the present invention.

The stack responsiveness ensuring process of the present embodiment includes Steps S951 to S955 in addition to Steps S941 and S942 shown in FIG. 6. Here, only a processing of each of Steps S951 to S955 is described.

In Step S951, a control unit 6 reduces an air supply flow rate to an exhaust combustor 40 by a predetermined amount when a stack temperature drops below a temperature threshold value Tth. In the present embodiment, the control unit 6 reduces the flow rate of air to be supplied to the exhaust combustor 40 by reducing an opening degree of an air flow rate control valve 342 by a step width determined in advance.

Since heat inside the exhaust combustor 40 is less likely to be discharged due to a reduced flow rate of air flowing into the exhaust combustor 40, the temperature of the exhaust combustor 40 increases and the temperature of anode gas to be supplied to the fuel cell stack 1 increases. Specifically, the temperature of a fuel cell stack 1 can be increased.

In Step S952, the control unit 6 judges whether or not the air supply flow rate to the exhaust combustor 40 has reached a lower limit value Qth. The lower limit value Qth mentioned here is an air flow rate minimally necessary to burn anode off-gas supplied to the exhaust combustor 40 or the sum of that air flow rate and a margin taking into account an error and the like. Specifically, the lower limit value Qth is a value for limiting so that unburned gas is not discharged from the exhaust combustor 40.

Then, the control unit 6 judges whether or not the stack temperature has reached a target temperature Ts_t if the air supply flow rate to the exhaust combustor 40 is larger than the lower limit value Qth. When the stack temperature reaches the target temperature Ts_t, the stack responsiveness ensuring process is finished. On the other hand, if the stack temperature is lower than the target temperature Ts_t, the control unit 6 returns to the processing of Step S951 and further reduces the amount of air to be supplied to the exhaust combustor 40 by a predetermined amount.

In Step S954, the control unit 6 supplies air to a reformer 26 by opening an anode system air supply valve 341 if the air supply flow rate to the exhaust combustor 40 is judged to have reached the lower limit value Qth in Step S952. In this way, air is burned in the reformer 26 to perform partial oxidation reforming for reforming the anode gas, wherefore the temperature of the reformed anode gas increases. Thus, the stack temperature increases.

In Step S955, the control unit 6 judges whether or not the stack temperature has reached the target temperature Ts_t after air is supplied to the reformer 26. When the stack temperature reaches the target temperature Ts_t, the stack responsiveness ensuring process is finished. On the other hand, if the stack temperature is lower than the target temperature Ts_t, the control unit 6 proceeds to the processing of Step S942 to increase an air supply flow rate and a fuel supply flow rate to the exhaust combustor 40 to increase the amount of heat generation of the exhaust combustor 40.

As just described above, the stack temperature is increased by reducing the air supply flow rate to the exhaust combustor 40 in Step S952. If the stack temperature still does not reach the target temperature Ts_t, partial oxidation reforming is performed to increase the stack temperature by supplying air to the reformer 26 in Step S954.

It should be noted that although the processings of Steps S954 and S955 are performed after the processings of Steps S951 to S953 are performed in the present embodiment, there is no limitation to this. The processings of Steps S951 to S953 and those of Steps S954 and S955 may be simultaneously performed or the processings of Steps S951 to S953 may be performed after the processings of Steps S954 and S955 are performed. Further, the processings of Steps S951 to S953 and those of Steps S954 and S955 may be performed after the processing of Step S942 is performed.

According to the fourth embodiment, the flow rate of air to be supplied to the exhaust combustor 40 is reduced within such a range that air is not lacking in the exhaust combustor 40 if the stack temperature drops during the IS operation. Since the inside of the exhaust combustor 40 is less likely to be cooled by inflowing air in this way, the stack temperature can be increased.

Further, according to the present embodiment, an oxidant supplying system 3 includes the reformer 26 for generating anode gas by reforming fuel gas heated by the exhaust combustor 40 and the anode system air supply valve (control valve) 341 for supplying air for cathode gas to the reformer 26. Then, the control unit 6 supplies air from the anode system air supply valve 341 to the reformer 26 when the stack temperature drops during the IS operation. Since the temperature of the anode gas reformed by a partial oxidation reforming reaction in the reformer 26 increases and the anode gas having a high temperature is supplied into the fuel cell stack 1 in this way, the stack temperature can be increased.

Fifth Embodiment

Figure 10:
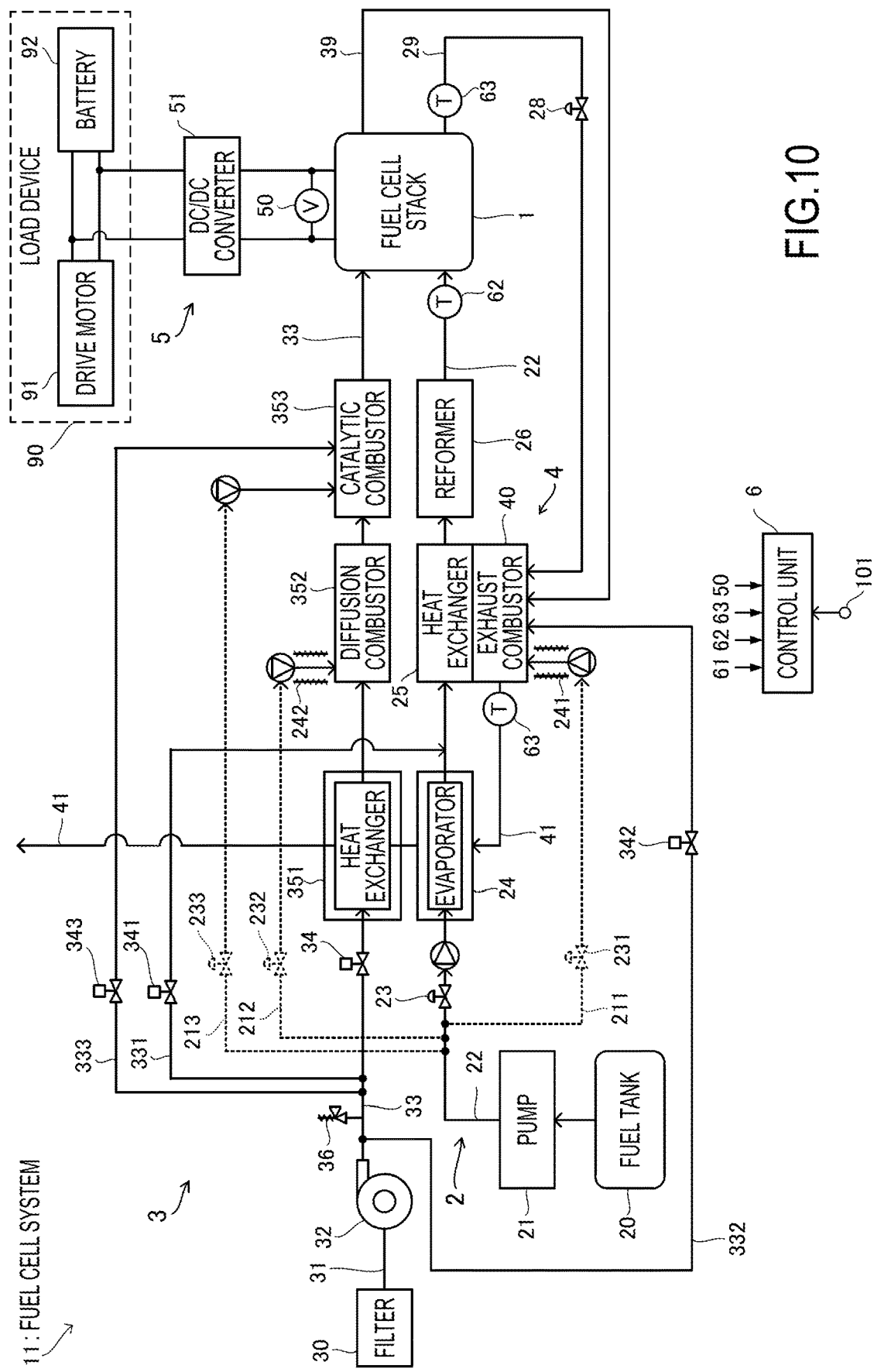
FIG. 10 is a configuration diagram showing a main configuration of a fuel cell system in a fifth embodiment of the present invention.

FIG. 10 is a diagram showing an example of the configuration of a fuel cell system 11 in the fifth embodiment of the present invention.

The fuel cell system 11 includes a heat exchanger 351, a diffusion combustor 352 and a catalytic combustor 353 instead of the heating device 35 of the fuel cell system 10 shown in FIG. 1. Further, the fuel cell system 11 includes a branch passage 333 for passing air from a compressor 32 to the catalytic combustor 353 and branch passages 211, 212 and 213 for passing fuel gas from a pump 21 to each of an exhaust combustor 40, the diffusion combustor 352 and the catalytic combustor 353. Control valves 343, 231, 232 and 233 are respectively provided in the branch passages 333, 211, 212 and 213.

Further, a shut-off valve 28 is mounted in an anode gas discharge passage 29. The shut-off valve 28 is closed after a stop control of the fuel cell system 11 is finished. In this way, a back flow of cathode off-gas and the like in the anode gas discharge passage 29 is prevented to suppress anode deterioration.

A relief valve 36 is mounted in a cathode gas supply passage 33. If a pressure in a cathode gas supply passage 33 exceeds a certain value, the cathode gas supply passage 33 is opened so that a specific load or higher is not applied to the compressor 32.

The control valve 343 supplies a fixed amount of air to the catalytic combustor 353 when a fuel cell stack 1 is started and closes the branch passage 333 after the end of the start-up.

The heat exchanger 351 heats air for fuel gas or air for cathode gas, utilizing heat of discharged gas discharged from an exhaust combustor 40.

The diffusion combustor 352 mixes both air heated by the heat exchanger 351 at the start-up of the fuel cell system 10 and supplied thereto and heating fuel supplied thereto from the branch passage 212 and heated by an electric heater 242. A mixture of the air and the heating fuel is ignited by an ignition device belonging to the diffusion combustor 352 to form a preheating burner for the catalytic combustor 353. After the end of the start-up, the air supplied from the heat exchanger 351 is supplied to the catalytic combustor 353.

The catalytic combustor 353 generates high-temperature combustion gas using a catalyst and the preheating burner during the start-up. In the catalytic combustor 353, air for combustion gas is supplied via the branch passage 333 and the heating fuel is supplied from the branch passage 213, and the both are mixed in a state in contact with the catalyst. By igniting the mixture of the air and the heating fuel by the preheating burner, a large amount of combustion gas is generated. This combustion gas contains no oxygen and mainly contains inert gas. Then, the combustion gas is supplied to a cathode electrode of the fuel cell stack 1 to heat the fuel cell stack 1. It should be noted that, after the end of the start-up, the generation of the combustion gas is finished and the air having passed through the heat exchanger 351 and the diffusion combustor 352 is supplied as cathode gas to the fuel cell stack 1.

The control valves 231, 232 and 233 respectively open the branch passages 211, 212 and 213 at the start-up of the fuel cell system 11 to cause the heating fuel to flow, and respectively close the branch passages 211, 212 and 213 at the end of the start-up. Further, an anode flow rate control valve 23 closes an anode gas supply passage 22 during the start-up, but opens the anode gas supply passage 22 to cause reforming fuel to flow at the end of the start-up.

At the start-up of the fuel cell system 11, the heating fuel supplied from the branch passage 211 and heated by the electric heater 241 is supplied to the exhaust combustor 40, and the combustion gas passed through the fuel cell stack 1 and air introduced from a combustor air supply passage 332 are mixed to heat the exhaust combustor 40 by a catalytic reaction.

Next, the operation of the fuel cell system 11 in the present embodiment is briefly described.

Figure 11:
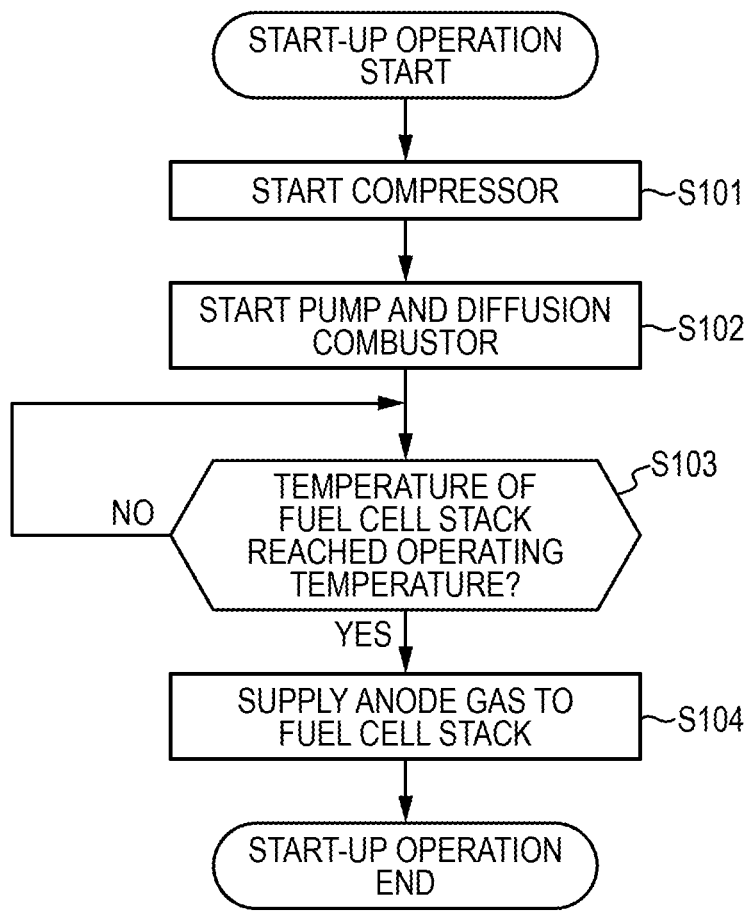
FIG. 11 is a flow chart showing an example of a start-up operation method for the fuel cell system in the fifth embodiment.

FIG. 11 is a flow chart showing a processing procedure example relating to a start-up operation for starting the fuel cell system 11.

When the start-up operation of the fuel cell system 11 is started, a control unit 6 starts the compressor 32 and opens each of a cathode flow rate control valve 34 and control valves 341, 342 to a fixed opening degree in Step S101. In this way, air (combustion gas) is supplied to the diffusion combustor 352 and the catalytic combustor 353. In Step S102, the control unit 6 starts the pump 21 and the diffusion combustor 352 (ignition device) and opens the control valves 231 to 233. In this way, the heating fuel is supplied to each of the diffusion combustor 352, the catalytic combustor 353 and the exhaust combustor 40. Then, the preheating burner is formed in the diffusion combustor 352, the combustion gas is generated in the catalytic combustor 353 utilizing this preheating burner, and the combustion gas passes through the fuel cell stack 1 to heat the fuel cell stack 1. Further, the combustion gas passed through the fuel cell stack 1 reaches the exhaust combustor 40 and the exhaust combustor 40 is heated and a heat exchanger 25 is heated by catalytic combustion with the heating fuel. Further, an evaporator 24 and the heat exchanger 351 are heated by post-combustion gas from the exhaust combustor 40.

In Step S103, the control unit 6 determines whether or not a temperature of the fuel cell stack 1 has reached an operating temperature necessary for power generation. Here, as a method for determining the temperature of the fuel cell stack 1, the fuel cell stack 1 may be determined to have reached the operating temperature, for example, if a combustor outlet temperature detected by a temperature sensor 63 exceeds a certain value.

It should be noted that it is originally necessary to judge whether or not a proper temperature for reforming the reforming fuel well has been reached also for the evaporator 24, the heat exchanger 25 and a reformer 26, but this is not necessary if the times required for these to reach the proper temperatures are shorter than a time required for the temperature of the fuel cell stack 1 to reach the operating temperature.

If the control unit 6 judges in Step S103 that the temperature of the fuel cell stack 1 has reached the operating temperature, the control unit 6 stops the diffusion combustor 352, closes each of the control valves 342, 343, 231, 232 and 233 and opens the anode flow rate control valve 23 in Step S104. In this way, the reforming fuel from a fuel tank 20 becomes anode gas (fuel gas) via the evaporator 24, the heat exchanger 25 and the reformer 26 and this anode gas is supplied to an anode electrode of the fuel cell stack 1. On the other hand, air continues to be supplied from the cathode flow rate control valve 34, is heated in the heat exchanger 351 and supplied as cathode gas (oxidant gas) to the fuel cell stack 1. Then, an electrochemical reaction by the anode gas and the cathode gas starts in the fuel cell stack 1, whereby a power generating operation is performed and the start-up operation is finished.

Next, an operation in the power generating operation of the fuel cell system 11 is described.

In the power generating operation of the fuel cell system 11, the reforming fuel supplied from the fuel tank 20 is first vaporized by the evaporator 24, the vaporized reforming fuel is heated by the heat exchanger 25, the heated reforming fuel is reformed into anode gas in the reformer 26, and this anode gas is supplied to the anode electrode of the fuel cell stack 1. On the other hand, air serving as the cathode gas is heated by the heat exchanger 351 and supplied to the cathode electrode of the fuel cell stack 1 through the diffusion combustor 352 and the catalytic combustor 353. In the fuel cell stack 1 having the anode gas and the cathode gas supplied thereto, power is generated by an electrochemical reaction and supplied to a DC/DC converter 51, and anode off-gas and cathode off-gas used in the electrochemical reaction are introduced to the exhaust combustor 40. Then, the anode off-gas and the cathode off-gas are burned to become discharged gas while in a mixed state, and this discharged gas heats the evaporator 24 and the heat exchanger 351.

According to the fifth embodiment, as in each of the above embodiments, the control unit 6 stops power supply from the fuel cell system 11 to the load device 90 and supplies the anode gas to the fuel cell stack 1 when the operating state of the fuel cell system 11 is switched from the power generating operation to the IS operation. In this way, functions and effects similar to those of the above embodiments can be obtained.

It should be noted that although the present invention is applied to the fuel cell system with the solid oxide fuel cells in the above embodiments, there is no limitation to this. The present invention can be applied also to such a fuel cell system with polymer electrolyte fuel cells as shown in FIG. 12.

Sixth Embodiment

Figure 12:
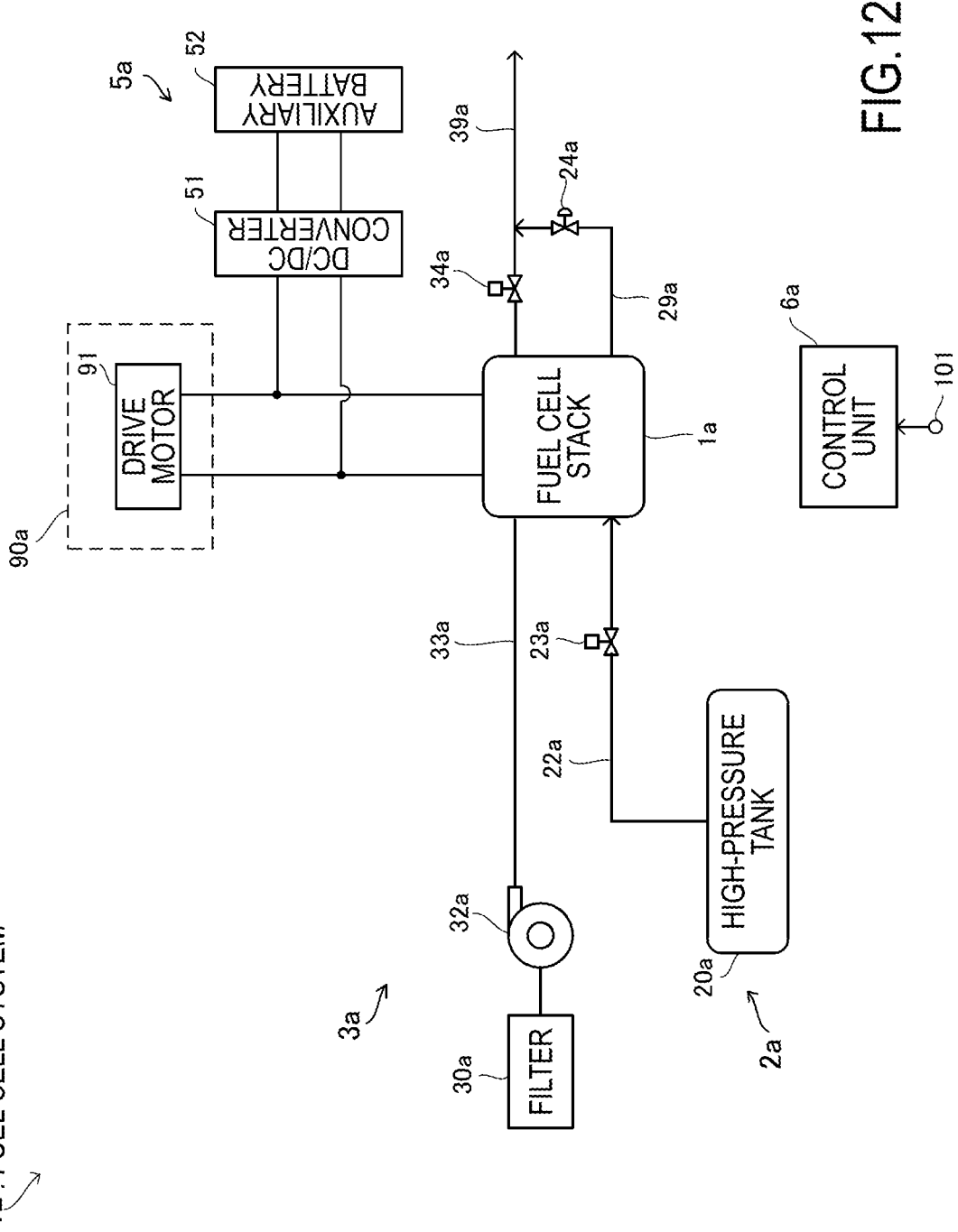
FIG. 12 is a configuration diagram showing an example of the configuration of a fuel cell system in a sixth embodiment of the present invention.

FIG. 12 is a configuration diagram showing an example of the configuration of a fuel cell system 12 with polymer electrolyte fuel cells.

The fuel cell system 12 supplies power to a drive motor 91 provided in a load device 90a. The fuel cell system 12 includes a fuel cell stack 1a formed by laminating a plurality of polymer electrolyte fuel cells, an anode gas supplying system 2a, a cathode gas supplying system 3a, a power supplying system 5a and a control unit 6a configured to control flow rates of anode gas and cathode gas to be supplied to the fuel cell stack 1a on the basis of required power of the drive motor 91.

The anode gas supplying system 2a includes a high-pressure tank 20a for storing the anode gas in a high-pressure state, an anode gas supply passage 22a, an anode pressure control valve 23a for adjusting a pressure of the anode gas, a purge valve 24a for discharging anode off-gas and an anode gas discharge passage 29a.

The cathode gas supplying system 3a includes a filter 30a, a compressor 32a, a cathode gas supply passage 33a, a cathode pressure control valve 34a for adjusting a pressure of the cathode gas and a cathode gas discharge passage 39a.

The power supplying system 5a includes a DC/DC converter 51 for supplying power from the fuel cell system 12 to the load device 90a and an auxiliary battery 52 for assisting power of the fuel cell stack 1.

Also in such a fuel cell system 12, the control unit 6a performs an IS operation, for example, when required power of the drive motor 91 becomes zero. In this case, the control unit 6a may stop power supply to the drive motor 91 by controlling the DC/DC converter 51 and cause the anode gas to be discharged to outside through an anode electrode of the fuel cell stack 1. Since air staying in the anode electrode is discharged during the IS operation in this way, a reduction in power generation performance of the fuel cell stack 1 can be suppressed.

Further, the present invention can be applied also to such a fuel cell system as to drive a turbine by combustion gas by burning, in a combustor, fuel off-gas and oxidant off-gas discharged from polymer electrolyte fuel cells.

Although the embodiments of the present invention have been described above, the above embodiments are merely an illustration of some application examples of the present invention and are not intended to limit the technical scope of the present invention to the specific configurations of the above embodiments.

For example, although the IS operation is performed when required power of the load device 90 becomes zero, the IS operation only has to be performed under the condition that power supply from the fuel cell system to the load device 90 is stopped. The IS operation may be performed even if power required of the fuel cell stack is a predetermined value larger than zero.

Further, although an example of issuing the IS operation request when the battery 92 is fully charged has been described in the above embodiments, the IS operation request may be issued when a SOC of the battery 92 reaches a predetermined value (e.g. 90%) or higher.

It should be noted that the above embodiments can be combined as appropriate.

The present application claims a priority based on Japanese Patent Application No. 2015-253852 filed on Dec. 25, 2015, all the contents of which are incorporated hereby by reference.

The invention claimed is:

1. A control method for a fuel cell system with a gas supplying device configured to supply fuel gas and oxidant gas to a fuel cell and a combustor configured to burn the fuel gas discharged from an anode of the fuel cell, comprising:
    a power generating operation step of performing a power generating operation for causing the fuel cell to generate power by controlling the fuel gas and the oxidant gas to be supplied to the fuel cell on the basis of a load required of the fuel cell; and
    an autonomous operation step of performing an autonomous operation of the fuel cell when the load drops to or below a predetermined value;
    power supply from the fuel cell system to the load being stopped and the fuel gas being passed to the anode of the fuel cell in the autonomous operation;
    wherein the oxidant gas is supplied to the combustor in the autonomous operation step.

2. The control method for the fuel cell system according to claim 1, wherein:
    in the autonomous operation step, the supply of the oxidant gas to the fuel cell is stopped when power supply from the fuel cell system to the load is stopped.

3. The control method for the fuel cell system according to claim 2, wherein:

the combustor heats the fuel gas to be supplied to the fuel cell; and a predetermined amount of the fuel gas is supplied to the anode in the autonomous operation step.

4. The control method for the fuel cell system according to claim 3, wherein:

in the autonomous operation step, an amount of the oxidant gas to be supplied to the combustor is increased for a specific period after power supply from the fuel cell system to the load is stopped.

5. The control method for the fuel cell system according to claim 1, wherein:

in the autonomous operation step, a small amount of the fuel gas is supplied to the anode or the supply of the fuel gas to the anode is stopped, and an amount of the fuel gas to be supplied to the anode is increased when a predetermined period elapses.

6. The control method for the fuel cell system according to claim 1, wherein:

in the autonomous operation step, a flow rate of the fuel gas to be supplied to the anode is controlled according to a state of the fuel cell when power supply to the load is stopped.

7. The control method for the fuel cell system according to claim 6, wherein:

in the autonomous operation step, the flow rate of the fuel gas to be supplied to the anode is increased when a voltage of the fuel cell drops below a predetermined voltage indicating a reduction in fuel gas concentration of the anode.

8. The control method for the fuel cell system according to claim 7, wherein:

the predetermined voltage is a voltage indicating that the fuel gas concentration decreases and the anode is deteriorated due to an increase in oxygen concentration of the anode.

9. The control method for the fuel cell system according to claim 7, wherein:

in the autonomous operation step, the flow rate of the fuel gas to be supplied to the combustor is increased when a temperature of the fuel cell drops below a predetermined threshold value for ensuring a temperature necessary for the power generation.

10. The control method for the fuel cell system according to claim 9, wherein:

in the autonomous operation step, a flow rate of the oxidant gas to be supplied to the combustor is reduced when the temperature of the fuel cell drops during the autonomous operation.

11. The control method for the fuel cell system according to claim 9, wherein:

in the autonomous operation step, an increase rate of the flow rate of the fuel gas is increased and a flow rate of the oxidant gas to be supplied to the combustor is increased when a temperature of the fuel cell drops during the autonomous operation.

12. The control method for the fuel cell system according to claim 10, wherein:

the gas supplying device includes:
a reformer configured to reform the fuel gas heated by the combustor; and
a control valve configured to supply, to the reformer, the oxidant gas to be supplied to the fuel cell; and in the autonomous operation step, the oxidant gas is supplied to the reformer by the control valve when the temperature of the fuel cell drops during the autonomous operation.

13. The control method for the fuel cell system according to claim 1, wherein:

in the autonomous operation step, unburned gas discharged from the anode of the fuel cell to the combustor is burned when power supply to the load is stopped.

14. A fuel cell system, comprising:

a fuel cell configured to generate power using fuel gas and oxidant gas;

a gas supplying device configured to supply the fuel gas and the oxidant gas to the fuel cell;

a combustor configured to burn the fuel gas discharged from an anode of the fuel cell;

a power controller configured to extract power from the fuel cell and supply the extracted power to a battery or a motor; and a control unit configured to perform a power generating operation of the fuel cell on the basis of a load required of the fuel cell; wherein the control unit is configured to stop power supply from the fuel cell system to the load and passing the fuel gas to the anode of the fuel cell when the load drops to or below a predetermined value, the control unit is configured to cause the combustor to receive oxidant gas when the load drops to or below the predetermined value.

* * * * *